(12) United States Patent
Matesan

(10) Patent No.: US 8,161,195 B2
(45) Date of Patent: Apr. 17, 2012

(54) ADAPTABLE MANAGEMENT IN SYNC ENGINES

(75) Inventor: Cristian M. Matesan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 589 days.

(21) Appl. No.: 12/410,479

(22) Filed: Mar. 25, 2009

(65) Prior Publication Data

US 2010/0251240 A1    Sep. 30, 2010

(51) Int. Cl.
*G06F 15/16* (2006.01)
*G06F 13/42* (2006.01)
*G06F 1/12* (2006.01)
*H04J 3/06* (2006.01)

(52) U.S. Cl. ........ 709/248; 709/223; 709/226; 709/227; 718/100; 718/102; 713/400; 713/500; 713/503; 713/600; 707/999.201; 707/999.202; 707/999.203; 707/999.204; 370/241; 370/324; 370/507; 715/764; 715/772; 715/810

(58) Field of Classification Search .................. 709/248, 709/223, 226–227; 718/100, 102; 370/241, 370/324, 507; 707/999.201–999.204; 713/400, 713/500, 503, 600; 715/764, 772, 810
See application file for complete search history.

(56) References Cited

U.S. PATENT DOCUMENTS

| | | | | |
|---|---|---|---|---|
| 5,790,805 A * | 8/1998 | Bantum | ........................ | 709/248 |
| 6,295,541 B1 * | 9/2001 | Bodnar et al. | ........................ | 1/1 |
| 7,007,106 B1 * | 2/2006 | Flood et al. | .................... | 709/248 |
| 7,047,435 B2 * | 5/2006 | Liou et al. | ..................... | 713/500 |
| 7,188,193 B1 * | 3/2007 | Getsin et al. | .................. | 709/248 |
| 7,581,025 B2 * | 8/2009 | Bartlett et al. | ................. | 709/245 |
| 7,739,410 B2 * | 6/2010 | Freedman | ...................... | 709/248 |
| 7,778,971 B2 * | 8/2010 | Freedman et al. | ............ | 707/620 |
| 7,792,794 B2 * | 9/2010 | Mills et al. | ..................... | 707/614 |
| 7,840,711 B2 * | 11/2010 | Otoshi et al. | .................. | 709/248 |
| 2002/0112247 A1 | 8/2002 | Horner et al. | | |
| 2006/0259521 A1 * | 11/2006 | Armenta et al. | ............. | 707/201 |
| 2006/0271600 A1 | 11/2006 | Goh et al. | | |
| 2006/0288043 A1 | 12/2006 | Novak et al. | | |
| 2007/0011665 A1 | 1/2007 | Gandhi et al. | | |
| 2007/0130217 A1 * | 6/2007 | Linyard et al. | ................ | 707/201 |
| 2008/0086494 A1 | 4/2008 | Heller et al. | | |
| 2008/0126568 A1 * | 5/2008 | Otoshi et al. | .................. | 709/248 |
| 2008/0168184 A1 * | 7/2008 | Freedman et al. | ............ | 709/248 |
| 2008/0168291 A1 * | 7/2008 | Freedman | ...................... | 713/375 |
| 2008/0168292 A1 * | 7/2008 | Freedman | ...................... | 713/375 |
| 2009/0064041 A1 * | 3/2009 | Bull et al. | ...................... | 715/810 |

(Continued)

OTHER PUBLICATIONS

"Sync Center", Retrieved at<<http://msdn.microsoft.com/en-us/library/aa369140(VS.85).aspx>>, Jan. 21, 2009, pp. 5.

(Continued)

*Primary Examiner* — John Follansbee
*Assistant Examiner* — Saket K Daftuar

(57) ABSTRACT

Synchronization of two or more items can be optimized through the use of parallel execution of synchronization tasks and adaptable processing that monitors and adjusts for system loading. Two or more synchronization tasks required to be performed for an item can, if not inherently serial in nature, be performed in parallel, optimizing synchronization of the item. Even if multiple synchronization tasks required for one item must be serially executed, e.g., download the item prior to translating the item, these synchronization tasks can be executed in parallel for different items, optimizing a download request involving two or more items. Moreover, multiple threads for one or more synchronization tasks can be concurrently executed when supportable by the current operating system resources. Rules can be established to ensure synchronization activity is not degraded by the overextension of system resources.

16 Claims, 13 Drawing Sheets

U.S. PATENT DOCUMENTS

2009/0100196 A1* 4/2009 Jia .................................. 709/248
2009/0228606 A1* 9/2009 McCarthy et al. ............ 709/248
2010/0205317 A1* 8/2010 Martin et al. ................. 709/231

OTHER PUBLICATIONS

Wong, et al. "Task Concurrency Management Methodology to Schedule the MPEG4 IM1 Player on a Highly Parallel Processor Platform", Retrieved at<<http://portal.acm.org/ft_gateway.cfm?id=371712&type=pdf&coll=GUIDE&dl=GUIDE&CFID=18554331&CFTOKEN=29819363>>, Codes 01 Copenhagen Denmark, ACM 2001, pp. 170-175.

Tanguay, et al."Nizza: A Framework for Developing Real-time Streaming Multimedia Applications", Retrieved at<<http://www.hpl.hp.com/techreports/2004/HPL-2004-132.pdf>>, Aug. 2, 2004, pp. 9.

* cited by examiner

ADAPTABLE MANAGEMENT IN SYNC ENGINES

BACKGROUND

Computers and computer-based devices, e.g., PDAs (personal digital assistants), external drives, etc., collectively referred to herein as computing devices, have the capability of running files that are downloaded from one computing device to another. Such downloaded files include but are not limited to audio files including, music and/or speech files, video files, including movies and portions of movies, and gaming files.

Files, and more generally, items, which can be files, portions of files, etc., downloaded from one computing device to another generally must be synced in order for them to execute properly on the downloaded computing device. Such synchronization refers to the need for keeping multiple copies of an item coherent between the computing devices. Synchronization is performed by various sync engines operating on computing devices that engage in the transfer of items, such as, but not limited to, desktop computers, laptop computers, PDAs and external hard drives.

In existing synchronization applications, or sync engines, the items requiring synchronization may also need to undergo one or more preliminary operations or tasks before synchronization. Such preliminary tasks include, but are not limited to, downloading the item from a third-party web site or computing device, such as an on-line store, transcoding the item to, e.g., a different streaming rate or content format, and acquiring a license for proper execution of the item. These preliminary, or pre-sync, tasks can be complex and lengthy, impacting the performance of the sync engine. When multiple items are queued for syncing between two computing devices the performance of a sync engine can decline exponentially, resulting in a significant corrosion of the end-user's experience and satisfaction.

Thus, it would be advantageous to employ an adaptable task management sync engine and processes that supports parallel processing of pre-sync tasks for two or more items queued for synchronization. Moreover it is desirable to optimize sync performance and enhance the utilization of system resources on the computing device executing the sync engine by automatically adjusting pre-sync task execution loads based on monitored system resource usage. Automatic execution load adjustment, or sync engine scalability, can enhance the performance of the sync engine executing on a current computing device and can also support optimal performance of the same sync engine running on alternative computing devices.

SUMMARY

This summary is provided to introduce a selection of concepts in a simplified form that are further described below in the Detailed Description. This summary is not intended to identify key or essential features of the claimed subject matter, nor is it intended to be used as an aid in determining the scope of the claimed subject matter.

Embodiments discussed herein include systems and methodology for optimizing synchronization of multiple sync items through parallel sync task processing and sync task scalability. Synchronization progress can be defined and tracked for reporting to end users.

In embodiments one or more preliminary operations or tasks, i.e., pre-sync tasks, may be required to be performed for one or more items, also referred to herein as sync items, contemporaneously requested for synchronization between two computing devices. For example, a sync item may require downloading from the internet to a first computing device, transcoding to a different streaming rate or content format, and having a license acquired for it prior to its synchronization between the first and second computing device. In embodiments individual task runners manage each pre-sync task and the synchronization task for sync items.

In embodiments required pre-sync tasks are identified for each contemporary sync item and pre-sync tasks are initiated based on sync item requirements and system resources. In embodiments two or more contemporary sync items can have different pre-sync tasks executing concurrently. Moreover, in embodiments, if serial pre-sync task execution is not required, two different pre-sync tasks can execute concurrently for a sync item. In embodiments one or more rules are established to govern the number of sync items that can be concurrently processed by any one pre-sync task or the synchronization task.

In embodiments equations are established to calculate the synchronization progress for each sync item at any time t. In embodiments the equations include a collection of one or more percentages where a percentage is assigned each pre-sync task required for the sync item and a percentage is assigned the synchronization task for the sync item.

BRIEF DESCRIPTION OF THE DRAWINGS

These and other features will now be described with reference to the drawings of certain embodiments and examples which are intended to illustrate and not to limit the invention, and in which.

DETAILED DESCRIPTION

In the following description, for purposes of explanation, numerous specific details are set forth in order to provide a thorough understanding of the present invention. It will be apparent, however, to one skilled in the art that the invention may be practiced without these specific details. In other instances well-known structures and devices are shown in block diagram form in order to avoid unnecessarily obscuring the invention. Any and all titles used throughout are for ease of explanation only and are not for use in limiting the invention.

Figure 1:
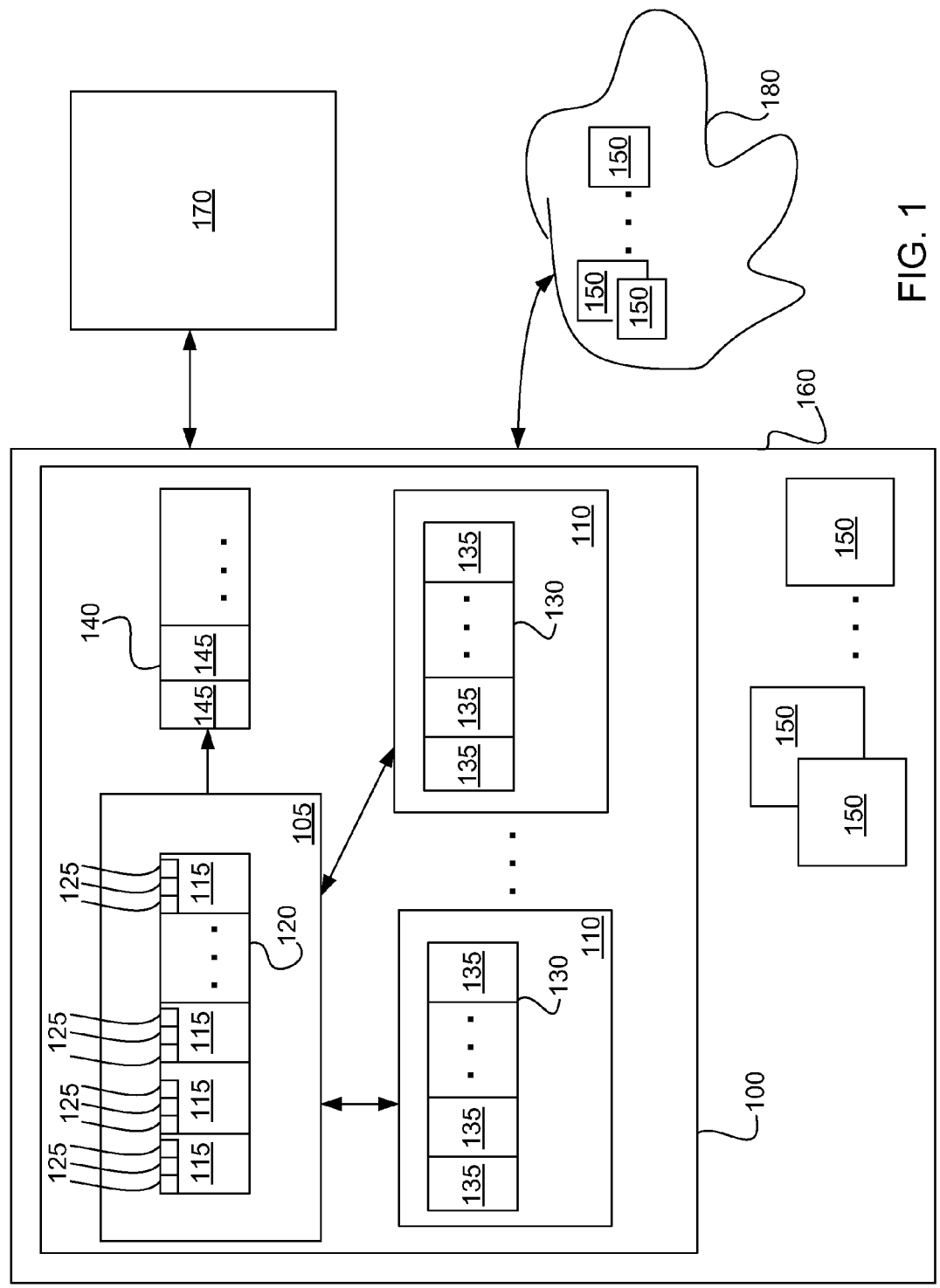
FIG. 1 depicts an embodiment adaptable synchronization system for syncing items between two or more computing devices.

Referring to FIG. 1, an end user of a first computing device 160 can request one or more items, e.g., files, 150 be synced to a second computing device 170. For example, an end user accessing their laptop can issue a command for all the sound track files of a music album to be synced to an MP3 player connected to, or otherwise in communication with, the laptop.

In an embodiment the requested items 150 will be synced by an adaptable sync engine 100, also referred to herein as an ASE 100, operating on the first computing device 160 for transfer to the second computing device 170.

In an embodiment one or more of the items 150 to be synced, also referred to herein as the sync items 150, may reside on the first computing device 160 at the time of the end-user request. In an embodiment one or more of the sync items 150 may first need to be downloaded from a third-party computing device or internet site 180 prior to synchronization by the first computing device 160 with the second computing device 170.

In an embodiment an engine manager 105 of the ASE 100 manages the synchronization of the sync items 150. In an embodiment the engine manager 105 analyzes each item request in an end-user synchronization request and determines, to the extent possible, all pre-sync tasks that must be performed on an item 150 prior to the actual item synchronization. In an embodiment pre-sync tasks are those tasks, or operations or actions, that must be performed for a sync item 150 prior to synchronization of the sync item 150 in order for the sync item 150 to properly execute on the computing device it is being transferred to.

In an embodiment a pre-sync task is downloading a requested sync item 150 from a third-party computing device or internet site 180 to the first computing device 160. In an embodiment a pre-sync task is transcoding, or translating, a requested sync item 150, which can involve, but is not limited to, changing the resolution, streaming rate and/or format of the sync item 150 for use on the second computing device 170. In an embodiment a pre-sync task is acquiring a license for a requested sync item 150.

In an embodiment, for example, the engine manager 105 determines if a requested sync item 150 is currently downloaded to the first computing device 160 or if it first needs to be retrieved from a third-party computing device or internet site 180. As another example, in an embodiment the engine manager 105 determines if a requested sync item 150 must be transcoded prior to synchronization. For another example, in an embodiment the engine manager 105 determines if a requested sync item 150 requires a license prior to successful operation on the second computing device 170.

In other embodiments the engine manager 105 analyzes each item in a synchronization request for more, less and/or different pre-sync tasks.

In an embodiment the engine manager 105 maintains a master queue 120 containing one entry 115 for each sync item 150 of a synchronization request. As the engine manager 105 analyzes a synchronization request it populates the master queue 120 with information on each pre-sync task required for each sync item 150. In an embodiment each entry 115 in the master queue 120 for each sync item 150 has one or more flags 125 associated with it that the engine manager 105 uses to coordinate any pre-sync tasks and the actual synchronization for the sync item 150. In an embodiment the engine manager 105 uses the master queue 120 to assist it in coordinating an adaptable synchronization of sync items 150.

In an embodiment each master queue entry 115 for a sync item 150 has an associated set of one or more flags 125 where there is one flag 125 for each pre-sync task required by the corresponding sync item 150 and one flag 125 for the actual synchronization task for the sync item 150. In an embodiment a master queue entry 115 can have a flag 125 for a download pre-sync task, a flag 125 for a transcode pre-sync task, and/or a flag 125 for a licensing pre-sync task. In an embodiment a master queue entry 115 has a flag 125 for the synchronization task.

In an embodiment there is a set of flags 125 for each sync item 150 in the master queue 120 that contains one flag 125 for each possible pre-sync task that may be required to be performed on any sync item 150. In this embodiment each flag 125 in a master queue entry 115 is set if the pre-sync task is required for the corresponding sync item 150 and is not set if the respective pre-sync task is not required.

In an alternative embodiment there is a set of flags 125 for each sync item 150 in the master queue 120 that contains one flag 125 for each pre-sync task that is required to be preformed for the respective sync item 150.

In another alternative embodiment there is no flag 125 used for the synchronization task for any sync item 150.

In an embodiment as the engine manager 105 analyzes a synchronization request it populates the master queue 120 with one entry 115 for each sync item 150 in the synchronization request. The engine manager 105 also analyzes the synchronization request to determine if any sync item 150 requires any pre-sync activity, e.g., downloading from a third-party source, transcoding, or obtaining a license for. In an embodiment the engine manager 105 sets a flag 125 for each sync item entry 115 for each pre-sync task determined to be required for the sync item 150. In an embodiment the engine manager 105 sets the synchronization flag for each entry 115 in the master queue 120.

Figure 2:
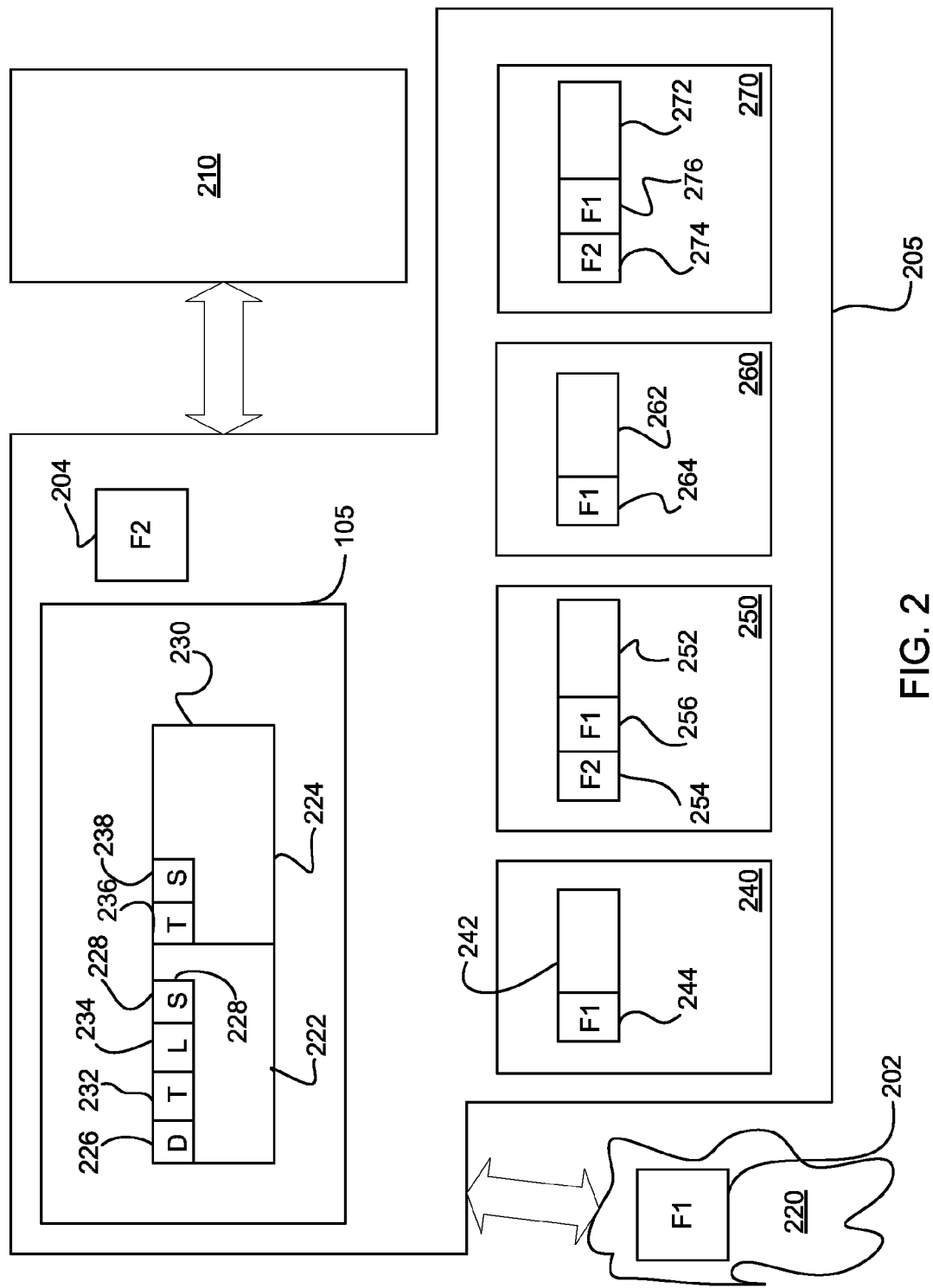
FIG. 2 illustrates an example of an embodiment adaptable synchronization system operating on a laptop computer to handle the concurrent synchronization of two files between the laptop computer and an MP3 player.

For example, and referring to FIG. 2, assume an end user uses a laptop computer 205 to request two files, F1 202 and F2 204, be copied to an MP3 player 210 connected to, or otherwise in communication with, the laptop 205. In an embodiment the two requested files F1 202 and F2 204 are synced between the laptop computer 205 and the MP3 player 210 by an ASE 100.

In the example of FIG. 2 the requested sync file F1 202 is currently accessible via an on-line store 220, and thus must be downloaded to the laptop 205 prior to synchronization with the MP3 player 210. In this example F1 202 must also be transcoded to an alternative streaming rate prior to synchronization. Finally, in this example a license must be obtained for F1 202 before it can properly activate on the MP3 player 210.

In the example of FIG. 2 the requested sync file F2 204 already resides on the end-user's laptop 205, and thus there is no download pre-sync task required for F2 204. In this example, however, F2 204 must be transcoded to a different format prior to synchronization. Finally, in this example any license required for F2 204 has already been obtained, and thus no license acquisition pre-sync task need be performed for F2 204.

In the example of FIG. 2, when the ASE 100 receives the synchronization request from the end user the engine manager 105 generates two entries in the master queue 230, one entry 222 for the sync file F1 202 and one entry 224 for the sync file F2 204. In an embodiment the engine manager 105 analyzes each of the sync files F1 202 and F2 204 for necessary pre-sync activities. In an embodiment and this example the engine manager 105 determines that F1 202 must first be downloaded from the third-party on-line store 220 to the end-user's laptop 205, and indicates this by setting a download, D, flag 226 for entry 222 in the master queue 230. At this initial time the engine manager 105 may be unable to determine if any other pre-sync task is required for F1 202 as the engine manger 105 currently has no access to F1 202. In an embodiment then, the engine manager 105 sets a sync, S, flag 228 for entry 222 in the master queue 230 to indicate F1 202 requires synchronization. In an alternative embodiment the engine manager 105 does not set an S flag 228 for entry 222 in the master queue 230 until it determines no other pre-sync tasks are required for the sync file F1 202. In a second alternative embodiment the engine manager 105 does not use sync flags for any entry 115 in the master queue 120.

As noted, in an embodiment the engine manager 105 analyzes each of the sync files F1 202 and F2 204 for necessary pre-sync activities. In an embodiment and this example the engine manager 105 determines that the sync file F2 204 is resident on the laptop 205, and thus does not require downloading. In analyzing F2 204 for synchronization, however, in this embodiment example the engine manager 105 determines that F2 204 requires transcoding to an alternative format prior to synchronization, and indicates this by setting a transcode, T, flag 236 for entry 224 in the master queue 230. At this initial time the engine manager 105 may be able to determine that F2 204 does not require a license and thus the engine manager 105 will not set a license, L, flag for entry 224 for F2 204 in the master queue 230. In an embodiment the engine manager 105 sets a sync, S, flag 238 for entry 224 in the master queue 230 to indicate the sync file F2 204 requires synchronization.

In an embodiment, after the first sync file F1 202 is successfully downloaded from the on-line store 220 to the laptop 205, the engine manager 105 analyzes F1 202 and determines that it requires transcoding to an alternative streaming rate prior to synchronization. In an embodiment the engine manager 105 indicates this transcoding pre-sync task is required for F1 202 by setting a transcode, T, flag 232 for entry 222 in the master queue 230. In this embodiment example the engine manager 105 can also now determine that the first sync file F1 202 requires a license and indicates this by setting a license, L, flag 234 for entry 222 in the master queue 230.

In an alternative embodiment where the engine manager 105 does not set the S flag 228 for the F1 entry 222 in the master queue 230 until it determines no other pre-sync tasks are required for F1 202 the engine manager 105 can now set the S flag 228 as in this alternative embodiment there are no other possible pre-sync tasks that can be performed for F1 202.

In an embodiment, when a pre-sync task is successfully completed for a sync item 150 the engine manager 105 clears the corresponding pre-sync flag 125 in the entry 115 for the sync item 150 in the master queue 120.

In an embodiment the ASE 100 can determine that a sync item 150 is ready for synchronization when there are no pre-sync task flags 125 set in the entry 115 in the master queue 120 for the sync item 150.

In other embodiments the engine manager 105 can use other methods for identifying and managing the pre-sync and synchronization tasks for a sync item 150. For example, in one such alternative embodiment the engine manager 105 employs a counter associated with each sync item 150 to identify the number of pre-sync tasks required for the respective sync item 150. As another example, the engine manager 105 establishes an entry in a master queue for each pre-sync task and the synchronization task required for each sync item 150 and links the entries for a sync item in, e.g., a linked list.

As noted, in some instances the engine manager 105 may be unable to determine all the pre-sync tasks for a sync item 150 when it first obtains an end user synchronization request that includes the sync item 150. For example, if a requested sync item 150 must first be downloaded from the internet 180, the engine manager 105 may be unable to determine whether or not the sync item 150 requires any translation until it is actually downloaded from the internet 180 and the engine manager 105 can analyze the sync item 150. As another example, the engine manager 105 may be unable to determine that a sync item 150 requires a license until an attempted synchronization of the sync item 150 with a second computing device 170 fails because of no license.

In these instances the engine manager 105 will not be able to set flags 125 for all the pre-sync tasks required for a sync item 150 in the master queue 120 at one initial time. In an embodiment the engine manger 105 sets an appropriate pre-sync task flag 125 for a sync item 150 in the master queue 120 at the time the engine manger 105 can determine that the respective pre-sync task is required for the sync item 150.

Referring again to FIG. 1, in an embodiment the ASE 100 spawns task managers 110, also referred to herein as task runners 110, for handling parallel execution of the pre-sync tasks for two or more sync items 150. In an embodiment each task runner 110 is responsible for a pre-sync task. For example, and again referring to FIG. 2, in an embodiment a download task runner 240 manages the downloading of sync items 150 that must be obtained from a third-party, e.g., a third computing device or an internet web site 180. In an embodiment a transcode task runner 250 manages transcoding sync items 150 that require translation. In an embodiment a license task runner 260 manages obtaining a license for sync items 150 that require a license prior to effective operation.

In an embodiment a task runner 270 manages the actual synchronization of the sync items 150, i.e., the transfer, or copying, of a sync item 150 from a first computing device 160 to a second computing device 170.

By using task runners the ASE 100 can support parallel execution of sync tasks, i.e., pre-sync tasks and the actual synchronization of sync items 150, between two computing devices for two or more sync items 150, optimizing synchronization and system performance. Even for the situation of sync tasks requiring serialization, e.g., a sync item 150 must be downloaded before it is transcoded before it is synced, the sync tasks use different system resources and can transpire in parallel for different sync items 150. Thus, one sync item 150 can be transcoded at the same time that a second sync item 150 is being downloaded. Moreover, dependent on the particular computing device 160 system's resources, one sync task may be performed on two or more sync items 150 in parallel. For example, system resources of an end user's computing device 160 may be capable of supporting two, three, etc., sync items 150 being transcoded in parallel on different threads, all managed by the task runner 110 for transcoding.

In an embodiment each task runner 110 maintains a runner queue 130 of entries 135 for the sync items 150 requiring the sync task managed by the respective task runner 110. In an embodiment the runner queues 130 are populated with entries 135 derived from the master queue 120. In this manner each task runner 110 queues up sync items 150 that require the task or operation supported by the respective task runner 110. The job of a task runner 110 is to manage the performance of the required task on each queued sync item 150, e.g., manage the downloading for each sync item 150 requiring downloading, manage the transcoding for each sync item 150 to be translated, etc.

In an embodiment the engine manager 105 populates the respective runner queues 130 with entries 135 derived from the master queue 120 entries 115. In an alternative embodiment each task runner 110 populates its runner queue 130 with information obtained from, or provided by, the engine manager 105 from the master queue 120 entries 115.

In an embodiment and the example of FIG. 2, initially the runner queue 242 for the download task runner 240 will have an entry 244 associated with entry 222 of the master queue 230 for the first sync item F1 202 as F1 202 requires downloading. In an embodiment and the example of FIG. 2 the runner queue 252 for the transcode task runner 250 will have an entry 254 associated with entry 224 of the master queue 230 for the second sync item F2 204 as F2 204 requires transcoding.

In an embodiment an entry 135 for a sync item 150 is not generated in a pre-sync task runner queue 130 or the sync task runner queue 130 until the sync item 150 is ready for the task processing managed by the respective pre-sync task runner 110 or sync task runner 110. Thus, in this embodiment and the example of FIG. 2, initially the runner queue 262 for the license task runner 260 will have no entries even though F1 202 will require a license as no entries for F1 202 will be made in any runner queue 130 other than the download runner queue 242 prior to F1 202 being successfully downloaded from the third party on-line store 220. In this embodiment and the example of FIG. 2, initially the runner queue 272 for the sync task runner 270 will also have no entries as neither F1 202 nor F2 204 can be synchronized prior to the successful conclusion of the necessary pre-sync tasks, i.e., downloading, transcoding and obtaining a license for F1 202, and transcoding for F2 204.

In an embodiment only one pre-sync task runner queue 130 or the sync task runner queue 130 will have an entry for a particular sync item 150 at any one time. Using the example of FIG. 2, only one runner queue, either the download task runner queue 242, the transcode task runner queue 252, the license task runner queue 262 or the synchronization task runner queue 272 will have an entry for F1 202 at any one time. Likewise, only one runner queue, e.g., runner queue 242, 252, 262 or 272, will have an entry for F2 204 at any one time.

In an alternative embodiment if more than one pre-sync task can be performed on a sync item 150 at the same time then more than one pre-sync task runner queue 130 may have concurrent entries for the sync item 150. For example, if a sync item 150, e.g., sync file F1 202, can be transposed at the same time that a license is being obtained for it then in this alternative embodiment the transcode task runner queue 252 and the license task runner queue 262 may simultaneously have entries 135 for F1 202.

In an embodiment and the example of FIG. 2, if the first sync file F1 202 is successfully downloaded the download task runner 240 notifies the engine manager 105. In an embodiment the engine manager 105 will clear the download, D, flag 226 for entry 222 in its master queue 230. In an embodiment and the example of FIG. 2 the engine manager 105 will analyze the newly downloaded sync file F1 202 and determine that F1 202 requires transcoding and a license. In an embodiment the engine manager 105 sets a transcode, T, flag 232 for entry 222 in the master queue 230 and sets a license, L, flag 234 for entry 222 in the master queue 230.

In an embodiment and the example of FIG. 2 the engine manager 105 notifies the transcode task runner 250 and an entry 256 is established in the transcode task runner queue 252 for sync file F1 202. The transcode task runner queue 252 may now have two active entries, 254 for sync file F2 204 and 256 for sync file F1 202, if the transcoding task for F2 204 is still active at this time. Alternatively, the transcode task runner queue 252 may now only have one active entry, 256 for F1 202, if the transcoding task F2 204 has already finalized.

In an embodiment, if the transcode task runner 250 is handling transcoding of F2 204 when entry 256 for F1 202 is established in its runner queue 252, and if system rules allow for it and system resources support it, the transcode task runner 250 initiates a task thread for processing the necessary translation for F1 202 while F2 204 transcoding is still processing. In this embodiment, if the transcode task runner 250 is handling transcoding F2 204 when entry 256 for F1 202 is established in its runner queue 252 but system resources do not allow for it and/or system resources cannot support it, the transcode task runner 250 will not initiate transcode processing for F1 202 until F2 204 transcoding is finalized.

In an alternative embodiment each pre-sync task and the sync task will only process one sync item 150 at a time although more than one pre-sync task and the sync task can be executing concurrently on different sync items 150.

In an alternative example, once the sync file F1 202 is successfully downloaded from the on-line store 220 to the end-user's laptop 205 the engine manager 105 can analyze F1 202 and may be able to determine that F1 202 requires transcoding. In this alternative example, even after downloading F1 202 the engine manager 105 may not be able to determine prior to a sync attempt that F1 202 requires a license. In this alternative example the engine manager 105 sets a transcode, T, flag 232 for entry 222 in the master queue 230, but does not at this time set a license, L, flag for entry 222.

In an embodiment and the example of FIG. 2, if the second sync file F2 204 is successfully transcoded the transcode task runner 250 notifies the engine manager 105. In an embodiment the engine manager 105 clears the transcode, T, flag 236 for entry 224 in its master queue 230. In an embodiment and the example of FIG. 2 the engine manager 105 will determine that there are no more pre-sync flags 125 set for the sync file F2 204 in entry 224 of its master queue 230 and will therefore notify the sync task runner 270. In an embodiment an entry 274 is established in the sync task runner queue 272 for F2 204. As there are no other active entries in the sync task runner queue 272 at this time the sync task runner 270 initiates a task thread for synchronizing, i.e., transferring or copying, F2 204 to the MP3 player 210.

In an embodiment and the example of FIG. 2, if the first sync file F1 202 is successfully transcoded the transcode task runner 250 notifies the engine manager 105. In an embodiment the engine manager 105 clears the transcode, T, flag 232 for entry 222 in its master queue 230. In an embodiment and the example of FIG. 2, if the license, L, flag 234 has been set the engine manager 105 notifies the license task runner 260 and an entry 264 is established in the license task runner queue 262 for F1 202. As there are no other active entries in the license task runner queue 262 at this time the license task runner 260 initiates a task thread for obtaining a license for F1 202.

In an embodiment and the example of FIG. 2, if a license for F1 202 is successfully obtained the license task runner 260 notifies the engine manager 105. In an embodiment the engine manager 105 clears the license, L, flag 234 for entry 222 in its master queue 230. In an embodiment and the example of FIG. 2 the engine manager 105 will determine that there are no more pre-sync flags 125 set for F1 202 in entry 222 of its master queue 230 and will therefore notify the sync task runner 270. In an embodiment an entry 276 is established in the sync task runner queue 272 for F1 202.

The sync task runner queue 272 may now have two active entries, 274 for sync file F2 204 and 276 for sync file F1 202, if the sync task for F2 204 is still active at this time. Alternatively, the sync task runner queue 272 may now only have one active entry, 276 for sync file F1 202, if the sync task for F2 204 has already finalized.

In an embodiment, if the sync task runner 270 is handling syncing of F2 204 when entry 276 for F1 202 is established in its runner queue 272, and if system rules allow for it and system resources support it, the sync task runner 270 initiates a task thread for syncing F1 202 while F2 204 is still being synced. In this embodiment, if the sync task runner 270 is handling the syncing of F2 204 when entry 276 for F1 202 is established in its runner queue 272 but system resources do not allow for it and/or system resources cannot support it, the sync task runner 270 will not initiate the syncing of F1 202 until F2 204 syncing is finalized.

In an alternative embodiment each task runner 110, rather than maintaining its own runner queue 130, references the master queue 120 for those entries 115 with flags 125 relevant to the task runner 110 that are set. In this alternative embodiment, for example, and again referring to FIG. 2, the download task runner 240 will reference entry 222 in the master queue 230 to determine F1 202 is to be downloaded. As another example in this alternative embodiment the transcode task runner 250 will reference entries 222 and 224 in the master queue 230 to determine F1 202 and F2 204 each require translating.

In an embodiment each task runner 110 manages its runner queue 130, performing the required pre-sync or sync task on those queued sync items 150 when it is the queued sync item's turn, i.e., next sync item 150 designated in the runner queue 130, and system rules allow for it and system resources are available.

In an embodiment if a system, i.e., the user's computing device 160, has the resources and computing power to support n task threads of the same sync task on individual sync items 150 operating in parallel, where n is greater than one (1), and n task threads are processing concurrently the task runner 110 must wait for one of these currently processing threads to finalize before it can initiate another task operation on any additional sync item 150. Thus, for example, if a system has the resources and computing power to support five (5) transcode threads operating in parallel and it is currently processing five (5) transcode threads and has another entry 135 in its runner queue 252 for a sixth sync item 150, the transcode task runner 250 must wait for one of the five transcode execution threads to end before it can initiate a new transcode processing thread for the sixth sync item 150.

In an embodiment maximum thread threshold values are established for each pre-sync task and the sync task. In this embodiment, even if a system, i.e., the user's computing device 160, has the resources and computing power to support n task threads of the same sync task on individual sync items 150 operating in parallel, where n is greater than one (1), if a threshold of k less than n (k<n) has been established for the sync task and k task threads are currently being processed by a task runner 110 the task runner 110 must wait before it can initiate another task thread for any additional sync item 150. Thus, for example, if a system has the resources and computing power to support five (5) transcode threads operating in parallel but a threshold of three (3) threads has been set for the transcode task runner 250 then if three (3) transcode threads are already processing the transcode task runner 250 must wait for one of these execution threads to end before it can initiate a fourth transcode thread for a fourth sync item 150.

In an embodiment each task runner 110 manages its own runner queue 130 and task operation(s) and communicates task information on queued sync items 150 to the engine manager 105. In an embodiment a task runner 110 notifies the engine manager 105 when it begins the task operation on a sync item 150. In an embodiment a task runner 110 periodically notifies the engine manager 105 regarding the progress of the task operation on a sync item 150. In an embodiment a task runner 110 notifies the engine manager 105 when a task is completed, or ended, for a sync item 150. In an embodiment a task runner 110 provides status on a task operation for each sync item 150 in the task runner's queue 130, e.g., task completed successfully, task failed to complete, etc. In an aspect of this embodiment a task runner 110 provides task failure information to the engine manager 105 for each sync item 150 that is not successfully processed by the task runner 110, such as, but not limited to, task failed due to timeout, task failed due to dropped communications connection, etc.

As noted, in an embodiment a sync item 150 is not queued to a task runner 110 until the engine manager 105 determines, based on information on the sync item 150 that the engine manager 105 has at the time, that the sync item 150 is ready for the task managed by the respective task runner 110. Thus, for example, and again referring to FIG. 2, sync item F1 202 is not queued to the transcode task runner queue 252 until the engine manager 105 determines that the download task runner 240 successfully downloaded F1 202. As noted, in an embodiment task runners 110 communicate with the engine manager 105 regarding the progress and effectiveness of a task operation on a sync item 150. Thus, in an embodiment the engine manager 105 uses status information provided by individual task runners 110 to determine when to queue, or otherwise notify a task runner 110 to queue, a sync item 150 for a new sync task. For example, the engine manager 105 uses status information from the download task runner 240 of FIG. 2, indicating the download of F1 202 was successfully completed, to queue F1 202, or notify the transcode task runner 250 to queue F1 202, in the transcode task runner queue 252 for translation.

In an embodiment status information from a task runner 110 for a sync item 150 is used by the engine manager 105 to inform an end user about a successful sync and/or provide the end user with information pertinent to why a synchronization of a particular sync item 150 failed.

In an embodiment each task runner 110 manages its runner queue 130, performing the required pre-sync or sync task on those queued sync items 150 also taking into consideration the maintenance of system rules, or restrictions. In an aspect of this embodiment system rules, or restrictions, are upward limits defined by the ASE 100. In an aspect of this embodiment the ASE 100 establishes the maximum number of threads that can be operated in parallel for each task runner 110. In variations of this aspect of this embodiment the ASE 100 can define a maximum number of parallel threads for each task runner 110 and/or can define maximum task runner 110 system resource utilization, i.e., the maximum system resources the particular task runner 110 can consume, or otherwise engage, at any particular time, and/or can define the maximum system resource utilization to be maintained by all task runners 110. System resource utilization can be defined by various system measurements or combinations thereof, including but not limited to, percentage of CPU utilization, percentage of system memory utilization, percentage of system network utilization, percentage of system disk usage, etc.

In an embodiment the ASE 100 defines the maximum, k, number of parallel threads for each task runner 110, e.g., one synchronization thread, one transcode thread, five download threads and one license acquisition thread, based on combinatory system performance analysis.

In another embodiment the ASE 100 modifies the maximum threshold system resources a particular task runner 110 can consume and/or the maximum threshold system resource utilization to be maintained by all task runners 110 based on the most current analysis of the performance of the computing device 160 system the ASE 100 operates on. In this embodiment the ASE 100 monitors its system resource usage and performance and dynamically adapts the task runner 110 loading to optimize current system resource usage.

In a second alternative embodiment each task runner 110 monitors the system resource usage pertinent to the task runner 110 and adapts its own maximum threshold thread count accordingly. In a variation of this second alternative embodiment each task runner 110 is assigned a maximum, k, threshold thread count by the ASE 100 but can limit its thread count to less than the assigned maximum threshold based on current resource usage and/or performance of those system resources required by the task runner 110. For example, in this variation of the second alternative embodiment the ASE 100 may assign the transcode task runner 250 a threshold maximum of five concurrent (5) threads. However, if the transcode task runner 250 monitors system performance and determines it is warranted, the transcode task runner 250 can independently limit itself to a smaller threshold maximum, e.g., only three (3) concurrently processing transcode threads.

In an embodiment the task runners 110 are self-maintaining in that they each manage their own queues 130, initiating threads and performing the required task(s) on each sync item 150 indicated in their respective queues 130. As noted, in an embodiment task runners 110 provide task status to the engine manager 105 for each sync item 150 processed.

In an embodiment the ASE 100 provides a GUI (graphical user interface) display to an end user via the end user's computing device 160 that indicates the synchronization progress of each sync item 150 in a particular or concurrent synchronization request(s). In an embodiment the ASE 100 also uses the GUI to display the global synchronization progress of all sync items 150 in a particular or concurrent synchronization request(s).

Figure 3:
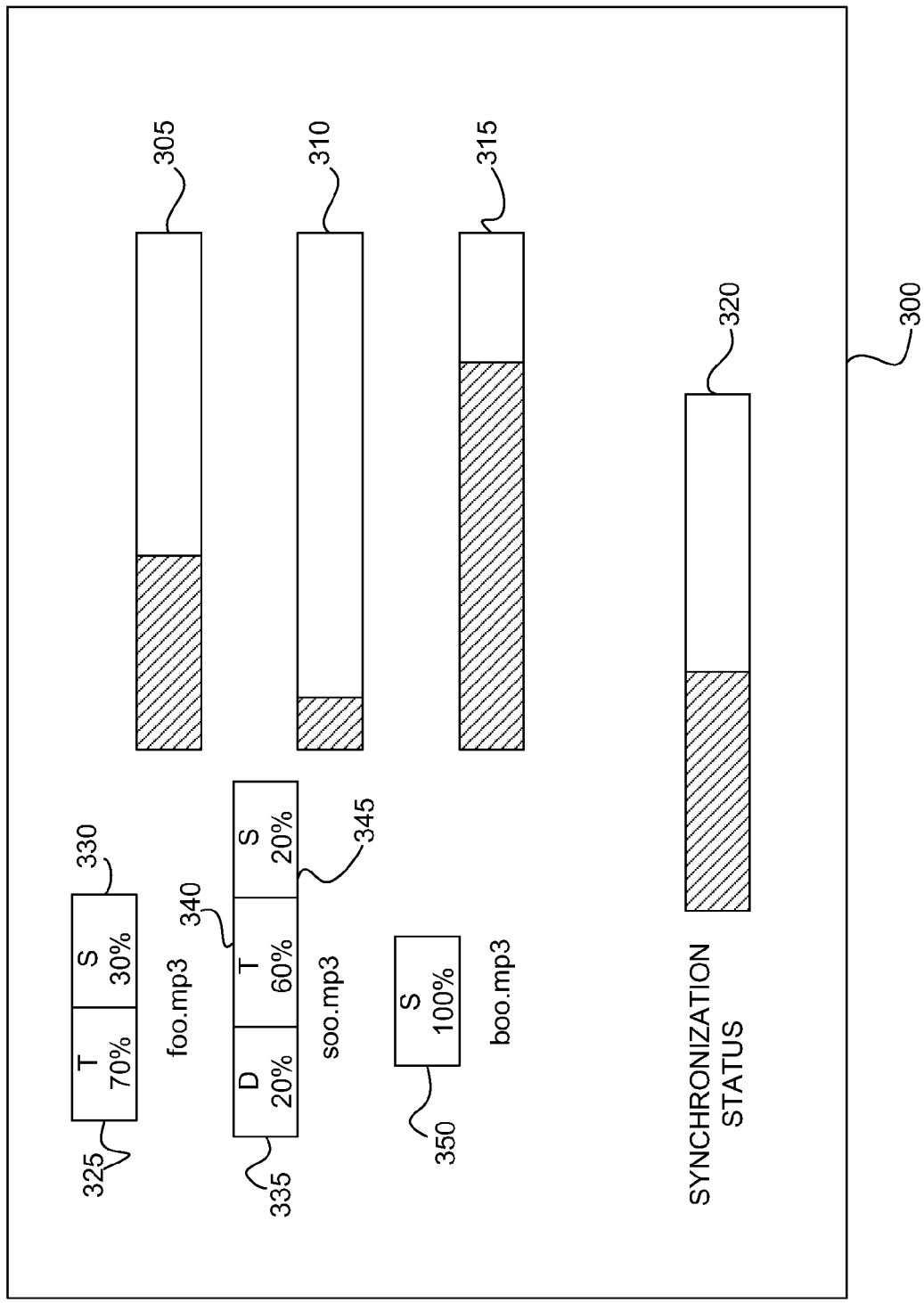
FIG. 3 depicts an exemplary GUI (graphical user interface) for displaying sync status for three items in a synchronization request.

FIG. 3 displays an embodiment example of a synchronization progress GUI 300, also referred to herein as a sync GUI 300, for an exemplary synchronization request of three (3) files, foo.mp3, soo.mp3 and boo.mp3. In an embodiment there is a status bar for each sync item 150 in the sync GUI 300 that indicates the synchronization for that particular sync item 150. As shown in the exemplary sync GUI 300 of FIG. 3, foo.mp3 has an associated status bar 305 that indicates the current synchronization progress for the foo.mp3 file; soo.mp3 has an associated status bar 310 that indicates the current synchronization progress for the soo.mp3 file; and boo.mp3 has an associated status bar 315 that indicates the current synchronization progress for the boo.mp3 file. Exemplary sync GUI 300 also has a global status bar 320 that indicates the current synchronization progress for the entire synchronization request consisting of foo.mp3, soo.mp3 and boo.mp3.

In other embodiments other formats can be used to indicate synchronization progress including, but not limited to, a display of percentage of synchronization completion numbers, e.g., 80%, 75%, etc.; color spectrum displays, e.g., white square indicates sync has not started, variations of gray squares indicate sync progress and black square indicates sync complete; a display of time remaining to completion, e.g., 3 minutes, etc.; etc.

In an embodiment for each combination of pre-sync tasks the ASE 100, based on historical performance analysis, assigns a completion effort percentage to each pre-sync task and the sync task. In an embodiment the assigned completion effort percentage indicates the relative percentage that the task takes to complete in relation to the time for the combination of pre-sync tasks and the sync task to historically complete. The assigned completion effort percentages for a combination of pre-sync tasks and the sync task equals one hundred (100). In an embodiment each completion effort percentage for a task for each combination of pre-sync tasks is an established number based on, e.g., historical performance analysis. In an aspect of this embodiment the ASE 100 determines the hardware configuration of the computing device 160 it is operating on and chooses the completion effort percentages for the combination of pre-sync tasks and the sync task based on the hardware configuration. In this embodiment aspect the ASE 100 can optimize synchronization status reporting by accounting for current system resource capabilities, e.g., current computing power and/or speed, usage of hardware accelerated transcoding, etc. In an alternative embodiment completion effort percentages are, or can be, adjusted on the fly, i.e., dynamically adjusted, based on, e.g., contemporary system configuration and/or performance analysis.

In an embodiment completion effort percentages are used to status synchronization progress for a sync item 150 and the global synchronization progress for a synchronization request of one or more sync items 150.

For example, for a combination of the download pre-sync task, the transcode pre-sync task and the sync task to be performed for a sync item 150 the ASE 100 may assign the download task a twenty percent (20%) completion effort, the transcode task a sixty percent (60%) completion effort and the sync task a twenty percent (20%) completion effort, all of which add up to one-hundred percent (100%). This example assumes that when a download and a transcode operation are required for a sync item 150 the download task consumes twenty percent (20%) of the overall time to finalize synchronization of the sync item 150, the transcode task consumes sixty percent (60%) and the actual synchronization of the sync item 150 to a second computing device 170 consumes twenty percent (20%) of the overall time to finalize synchronization of the sync item 150. Referring to FIG. 3, sync item soo.mp3 requires a download, a transcode and the actual synchronization and thus, in this example the download task for soo.mp3 is assigned a twenty percent (20%) completion effort percentage 335, the transcode task for soo.mp3 is assigned a sixty percent (60%) completion effort percentage 340 and the synchronization task for soo.mp3 is assigned a twenty percent (20%) completion effort percentage 345.

As another example, for a combination of a transcode pre-sync task and the sync task to be performed for a sync item 150 the ASE 100 may assign the transcode task a seventy percent (70%) completion effort and the sync task a thirty percent (30%) completion effort, again adding up to one-hundred percent (100%). This example assumes that when only a transcode pre-sync task operation is required for a sync item 150 the transcode task consumes seventy percent (70%) of the overall time to finalize synchronization of the sync item 150 and the actual synchronization of the sync item 150 to a second computing device 170 consumes thirty percent (30%) of the overall synchronization time. Referring to FIG. 3, foo.mp3 requires a transcode and actual synchronization and thus, in this example the transcode task for foo.mp3 is assigned a seventy percent (70%) completion effort percentage 325 and the synchronization task for foo.mp3 is assigned a thirty percent (30%) completion effort percentage 330.

As a final example, if no pre-sync tasks are required for a sync item 150 the actual synchronization of the sync item 150 to a second computing device 170 is assigned one hundred percent (100%), meaning that the sync task itself is one-hundred percent of the synchronization effort for the sync item 150. Referring to FIG. 3, boo.mp3 requires only synchronization, and no pre-sync task, and thus the synchronization task for boo.mp3 is assigned a one-hundred percent (100%) completion effort percentage 350.

In an embodiment, when the ASE 100 receives a synchronization request for at least one sync item 150 the engine manager 105 identifies, to the extent possible, the pre-sync tasks required for the sync item 150 and, based on the combination of identified pre-sync tasks, assigns the combination completion effort percentages for the sync item 150.

In an embodiment the engine manager 105 keeps track of the synchronization progress for a sync item 150 using the following Formula 1:

ItemSyncProgress=SyncProgress*Sync Completion Effort Percentage+Σ(Pre-SyncTaskProgress*Pre-SyncTaskProgress Completion Effort Percentage)   Formula 1

Thus, referring to FIG. 3, assume that at time T1 foo.mp3 is fifty percent (50%) complete with the pre-sync transcode operation. Using Formula 1, the sync progress for foo.mp3 at time T1 is thirty-five percent (35%) complete:

foo.mp3 sync progress (T1)=0/100 (SyncProgress) *30/100 (Sync Completion Effort %)+(50/100 (Transcode TaskProgress)*70/100 (Transcode Completion Effort %))

foo.mp3 sync progress (T1)=0 (Sync Progress)+35/100 (Transcode Progress)=35/100=35%

As another example, and again referring to FIG. 3, assume that at time T1 soo.mp3 is fifty percent (50%) complete with the pre-sync download operation. As soo.mp3 cannot be transcoded prior to downloading, at time T1 the transcode operation for soo.mp3 has not been started. And as all pre-sync operations must be performed prior to the actual synchronization of soo.mp3 to a second computing device 170, at time T1 the sync task has also not been initiated for soo.mp3. Using Formula 1, the sync progress for soo.mp3 at time T1 is ten percent (10%):

soo.mp3 sync progress (T1)=0/100 (SyncProgress) *20/100 (Sync Completion Effort %)+(50/100 (Download Task Progress)*20/100 (Download Completion Effort %))+(0/100 (Transcode TaskProgress)*60/100 (Transcode Completion Effort %))

soo.mp3 sync progress (T1)=0(Sync Progress)+10/100 (Download Progress)+0/100 (Transcode Progress)=10/100=10%

As a third example, assume that at time T1 boo.mp3 is seventy-five percent (75%) complete with the sync operation. The boo.mp3 sync item in the FIG. 3 example does not require any pre-sync task operations. Thus, using Formula 1 the sync progress for boo.mp3 at time T1 is seventy-five percent (75%):

boo.mp3 sync progress (T1)=75/100 (SyncProgress) *100/100 (Sync Completion Effort %)

boo.mp3 sync progress (T1)=75/100 (Sync Progress) =75%

In an embodiment and the example of FIG. 3 each of the status bars 305, 310 and 315 is shaded to indicate the percentage completion of each individual sync item 150 at a particular time. Thus, at time T1, status bar 305 for foo.mp3 will be thirty-five percent (35%) shaded, status bar 310 for soo.mp3 will be ten-percent (10%) shaded, and status bar 315 for boo.mp3 will be seventy-five percent (75%) shaded.

In an embodiment the engine manager 105 keeps track of the synchronization progress for all the sync items 150 in a synchronization request or concurrent synchronization requests, i.e., the sync set. In an embodiment the engine manager 105 keeps track of the global sync progress for an entire sync set using the following Formula 2:

$$ItemCntGlobalSyncProgress = \left(\sum_{i=1} (SyncProgress_i * Sync\ Completion\ Effort\ Percentage_i) + \sum_{k} (Pre\text{-}SyncTaskProgress_{ik} * Pre\text{-}SyncTask\ Completion\ Effort\ Percentage_{ik})\right) / ItemCnt$$

Formula 2

Using the example of FIG. 3 and Formula 2, the global sync progress for foo.mp3, soo.mp3 and boo.mp3 at time T1 is forty percent (40%) complete:

GlobalSyncProgress (T1)=((0/100 SyncProgress$_1$ $_{(foo.mp3)}$*30/100 Sync Completion Effort %$_{1(foo.mp3)}$)+(50/100 (Transcode TaskProgress$_1$ $_{(foo.mp3)}$)*70/100 (Transcode Completion Effort %$_{1(foo.mp3)}$))+0/100 SyncProgress$_{2(soo.mp3)}$*20/100 Sync Completion Effort %$_{2(soo.mp3)}$)+(50/100 (Download TaskProgress$_{2(soo.mp3)}$)*20/100 (Download Completion Effort %$_{2(boo.mp3)}$))+(0/100 (Transcode TaskProgress$_{2(soo.mp3)}$)*60/100 (Transcode Completion Effort %$_{2(boo.mp3)}$))+(75/100 SyncProgress$_{3(boo.mp3)}$*100/100 Sync Completion Effort %$_{3(boo.mp3)}$))/(ItemCnt=3)

GlobalSyncProgress (T1)=(0/100 (SyncProgress$_1$ $_{(foo.mp3)}$)+35/100 (Transcode TaskProgress$_1$ $_{(foo.mp3)}$)+0/100 (SyncProgress$_{2(soo.mp3)}$))+10/100 (Download TaskProgress$_{2(soo.mp3)}$)+0/100 (Transcode TaskProgress$_{2(soo.mp3)}$)+75/100 (SyncProgress$_{3(boo.mp3)}$))/3

GlobalSyncProgress (T1)=(35/100 (Transcode TaskProgress$_{1(foo.mp3)}$)+10/100 (Download TaskProgress$_{2(soo.mp3)}$)+75/100 (SyncProgress$_3$ $_{(boo.mp3)}$))/3=(120/100)/3=40/100=40%

In an embodiment and the example of FIG. 3 the global sync progress status bar 320 is shaded to indicate the percentage completion of all the sync items 150 in a sync set. Thus, at time T1, status bar 320 for the combination of the foo.mp3 sync item, soo.mp3 sync item and boo.mp3 sync item is forty percent (40%) shaded.

FIGS. 4A-4F illustrate an embodiment logic flow for implementing an embodiment engine manager 105 of an embodiment ASE 100. While the following discussion is made with respect to systems portrayed herein the operations described may be implemented in other systems. Further, the operations described herein are not limited to the order shown. Additionally, in other alternative embodiments more or fewer operations may be performed.

Figure 4A:
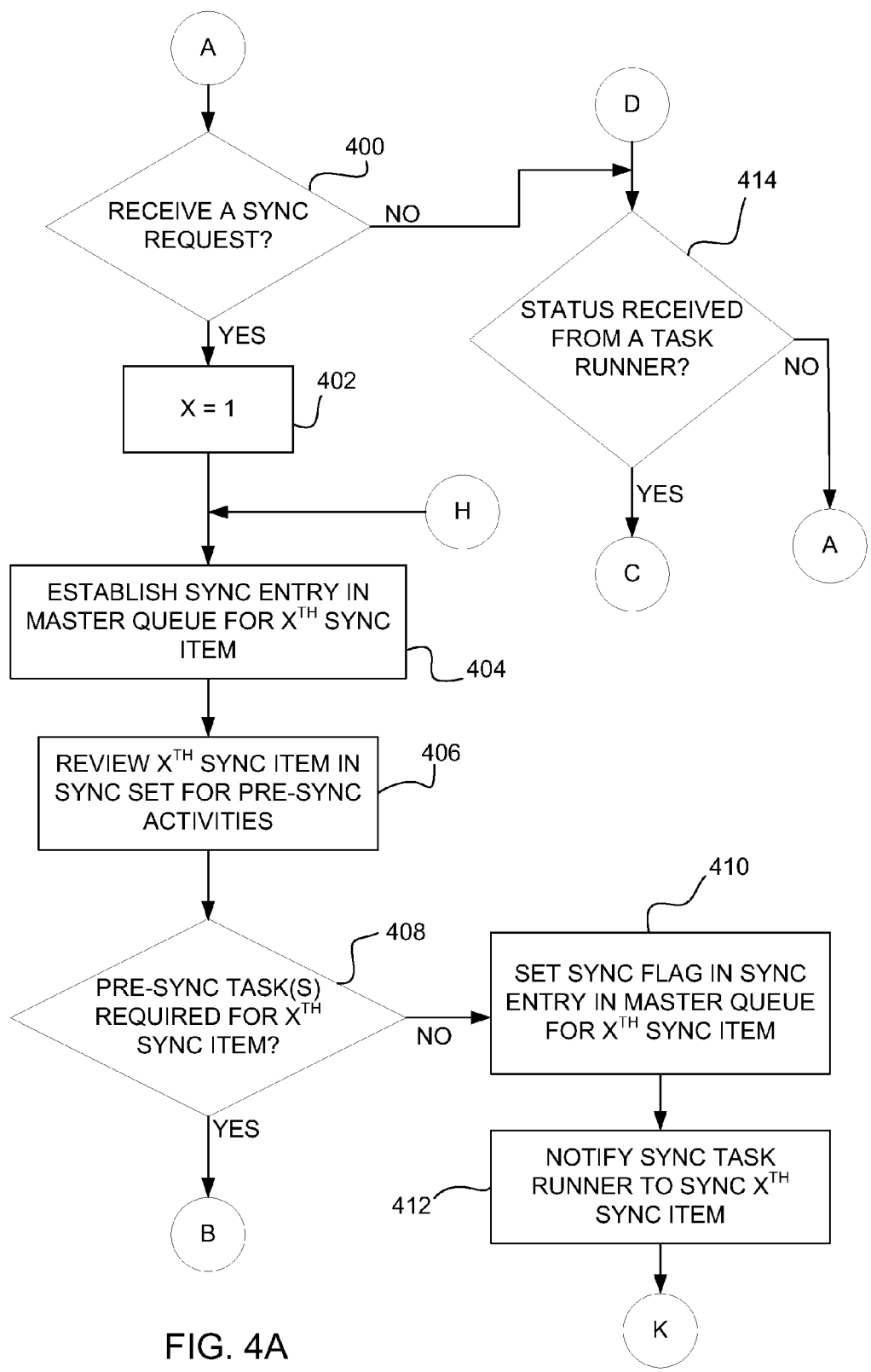
FIGS. 4A-4G illustrate an embodiment logic flow for an engine manager of an adaptable sync engine.

Referring to FIG. 4A, in an embodiment at decision block 400 a determination is made as to whether there is a sync request. If yes, in an embodiment a variable, x, for keeping track of the number of sync items in the current sync request, or sync set, is initialized to one (1) 402. In an embodiment an entry in a master queue is established for the x$^{th}$ sync item 404.

In an embodiment the x$^{th}$ sync item in the sync set is reviewed by the engine manager to determine if the x$^{th}$ sync item requires any pre-sync activities, e.g., transcoding, obtaining a license, etc., 406.

At decision block 408 a determination is made as to whether the x$^{th}$ sync item requires any pre-sync activity(ies). If no, in an embodiment the engine manager sets a sync flag in the master queue entry for the x$^{th}$ sync item indicating the x$^{th}$ sync item requires syncing 410. In an embodiment the engine manager notifies the sync task runner to sync the X$^{th}$ sync item 412.

Figure 4B:
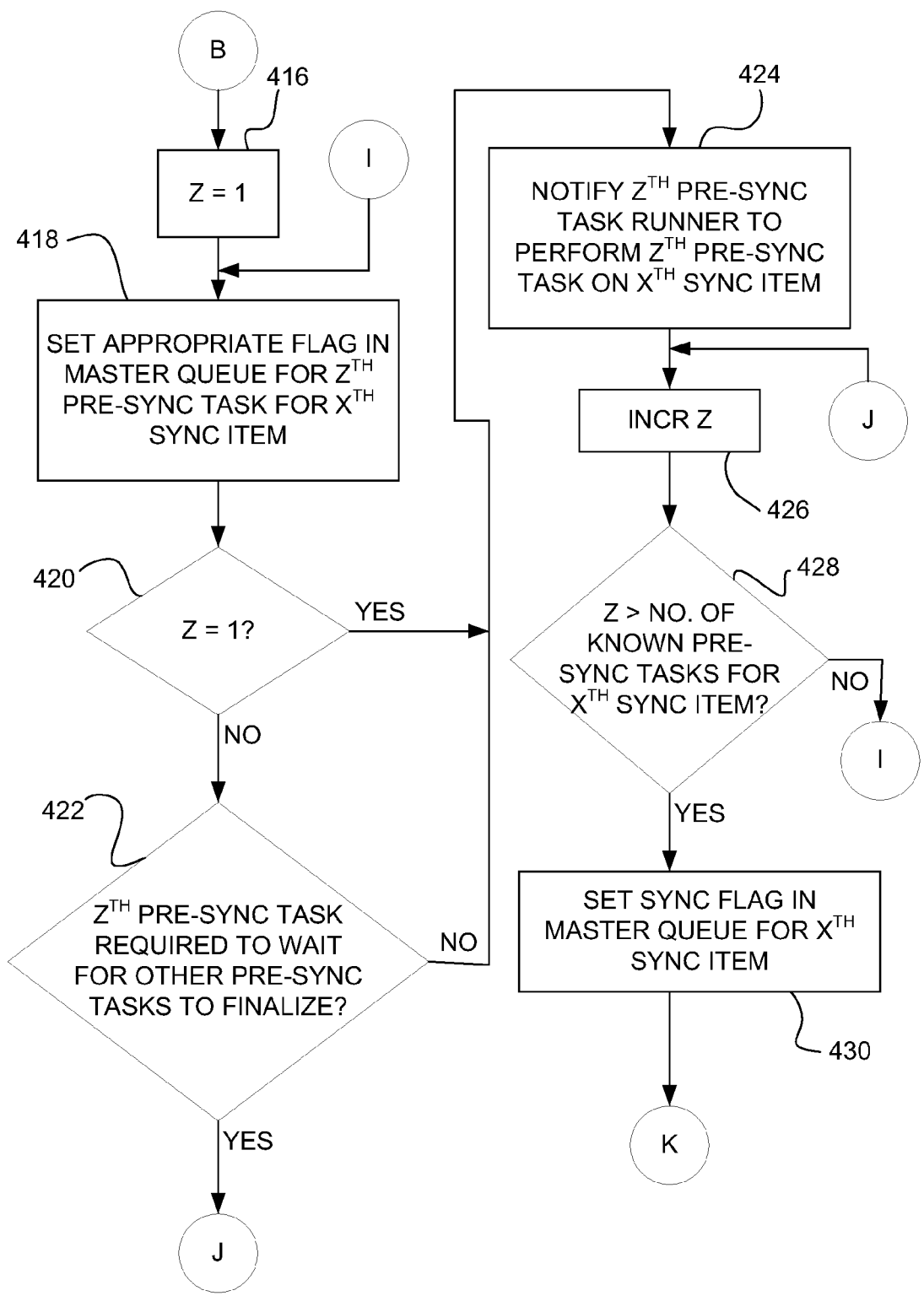
Figure 4C:
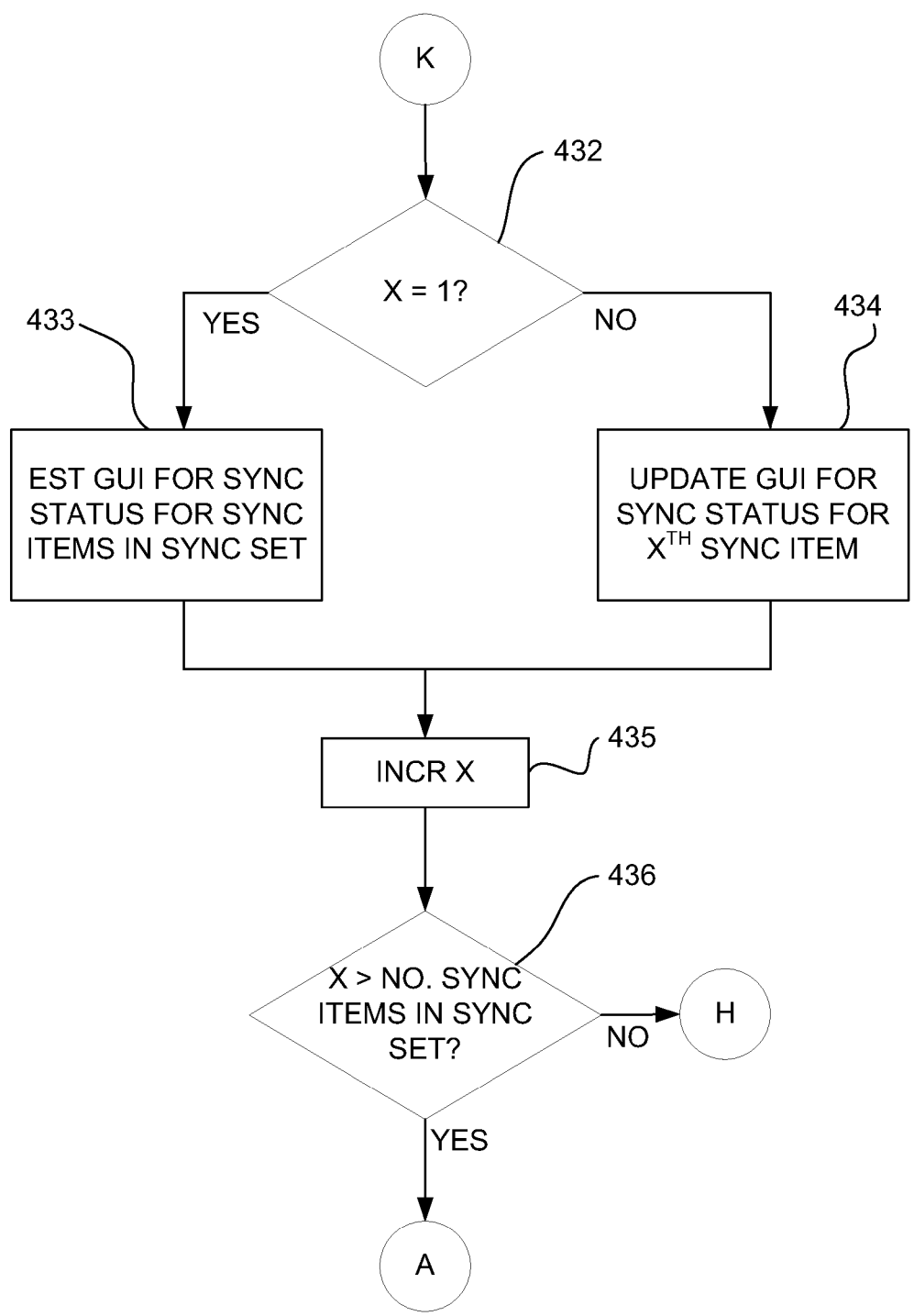

Referring to FIG. 4C, in an embodiment at decision block 432 a determination is made as to whether variable x is equal to one, indicating that the engine manager is processing the first sync item in a sync set. If yes, in an embodiment a sync GUI is established for displaying status for the sync request 433. In an embodiment in establishing the sync GUI the engine manager establishes the picture display that is used by the engine manager to notify an end user of the current sync status for the individual items in the current sync request as well as the overall sync status for the sync set 433. As previously discussed FIG. 3 is an embodiment GUI for displaying the sync status for an exemplary sync request for three files. In an embodiment, as part of establishing the sync GUI the engine manager establishes the formula to be used to determine sync status for the x equals one, i.e., first, sync item 433. As previously discussed, in an embodiment the engine manager establishes the formula for use in determining current sync status taking into consideration the identified pre-sync tasks required to be performed on the sync item 433.

If at decision block 432 it is determined that variable x is greater than one, in an embodiment the sync GUI is updated to include the current $x^{th}$ sync item in the sync set 434. In an embodiment, as part of updating the sync GUI the engine manager establishes the formula to be used to determine sync status for the current $x^{th}$ sync item 434. As previously discussed, in an embodiment the engine manager establishes the formula for use in determining current sync status taking into consideration the identified pre-sync tasks required to be performed on the sync item 434. In an embodiment the sync GUI is also updated for displaying sync status for the entire sync set 434 to include the current $x^{th}$ sync item 434.

Variable x, which in an embodiment is used to keep track of the number of sync items in a current sync set, is incremented 435. At decision block 436 a determination is made as to whether variable x is greater than the number of sync items in the current sync set.

If no, in an embodiment, and referring again to FIG. 4A, the engine manager establishes an entry in the master queue for the new $x^{th}$ sync item 404. If yes, in an embodiment the logic flow returns to decision block 400 of FIG. 4A where a determination is made as to whether there is a sync request to process.

At decision block 408 of FIG. 4A, if it is determined that the $x^{th}$ sync item requires at least one pre-sync activity, then referring to FIG. 4B, in an embodiment a variable, z, for keeping track of the known number of pre-sync tasks required for the $x^{th}$ sync item, is initialized to one (1) 416. In an embodiment the engine manager sets an appropriate flag in the master queue for the $z^{th}$ pre-sync task required for the $x^{th}$ sync item 418. For example the engine manager may set a transcode, T, flag in the sync entry in the master queue for the first (x=1) sync item in the current sync set. As another example the engine manager may set a download, D, flag in the sync entry in the master queue for the second (x=2) sync item in the current sync set.

In an embodiment at decision block 420 a determination is made as to whether the variable z is equal to one (1), i.e., whether the engine manager is processing the first known pre-sync task for the current $x^{th}$ sync item. If no then in an embodiment at decision block 422 a determination is made as to whether the $z^{th}$ pre-sync task for the $x^{th}$ sync item must wait for other pre-sync tasks for the $x^{th}$ sync item to complete. For example, the engine manager can be processing a second, transcoding, pre-sync task (z=2) for a first sync item (x=1) where the first pre-sync task for the first sync item is a download from an on-line store. In this example at decision block 422 a determination is made as to whether the second pre-sync task, transcoding, must wait for the first pre-sync task, downloading, to complete before the second pre-sync transcoding task can begin.

If at decision block 420 it is determined that z is equal to one, i.e., the engine manager is processing a first known pre-sync task for the current $x^{th}$ sync item, or at decision block 422 it is determined that the $z^{th}$ pre-sync task need not wait for any other pre-sync task for the $x^{th}$ sync item to complete, then in an embodiment the engine manager notifies the task runner associated with the $z^{th}$ pre-sync task to perform the $z^{th}$ pre-sync task on the $x^{th}$ sync item 424. For example, and referring to FIG. 2, the engine manager 105 can notify the transcode task runner 250 to translate the second sync item F2 204 in the current sync set of F1 202 and F2 204.

In an embodiment variable z is incremented 426. At decision block 428 a determination is made as to whether variable z is greater than the number of known pre-sync tasks for the current $x^{th}$ sync item. If no, in an embodiment the engine manager sets an appropriate flag in the master queue for the new $z^{th}$ pre-sync task required for the $x^{th}$ sync item 416.

If at decision block 428 it is determined that z is greater than the number of known pre-sync tasks for the current $x^{th}$ sync item, i.e., all known pre-sync tasks for the $x^{th}$ sync item have been identified, then in an embodiment the engine manager sets a sync flag in the sync entry in the master queue for the $x^{th}$ sync item to indicate that the $x^{th}$ sync item requires syncing 430.

Referring to FIG. 4C, in an embodiment at decision block 432 a determination is made as to whether variable x is equal to one, indicating that the engine manager is processing the first sync item in a sync set. If yes, in an embodiment a sync GUI is established for displaying status for the sync request 433. If no, in an embodiment the sync GUI is updated to include the current $x^{th}$ sync item in the sync set 434. Variable x is incremented 435 and at decision block 436 a determination is made as to whether variable x is greater than the number of sync items in the current sync set.

Referring again to FIG. 4B, at decision block 422 if it is determined that the $z^{th}$ pre-sync task is required to wait for other pre-sync tasks for the $x^{th}$ sync item to complete, then in an embodiment variable z is incremented 426.

Referring back to FIG. 4A, if at decision block 400 it is determined that there is no current sync request to be processed then in an embodiment at decision block 414 a determination is made as to whether status has been received from a task runner. If no, in an embodiment control returns to decision block 400 where again a determination is made as to whether or not there is a sync request.

Figure 4D:
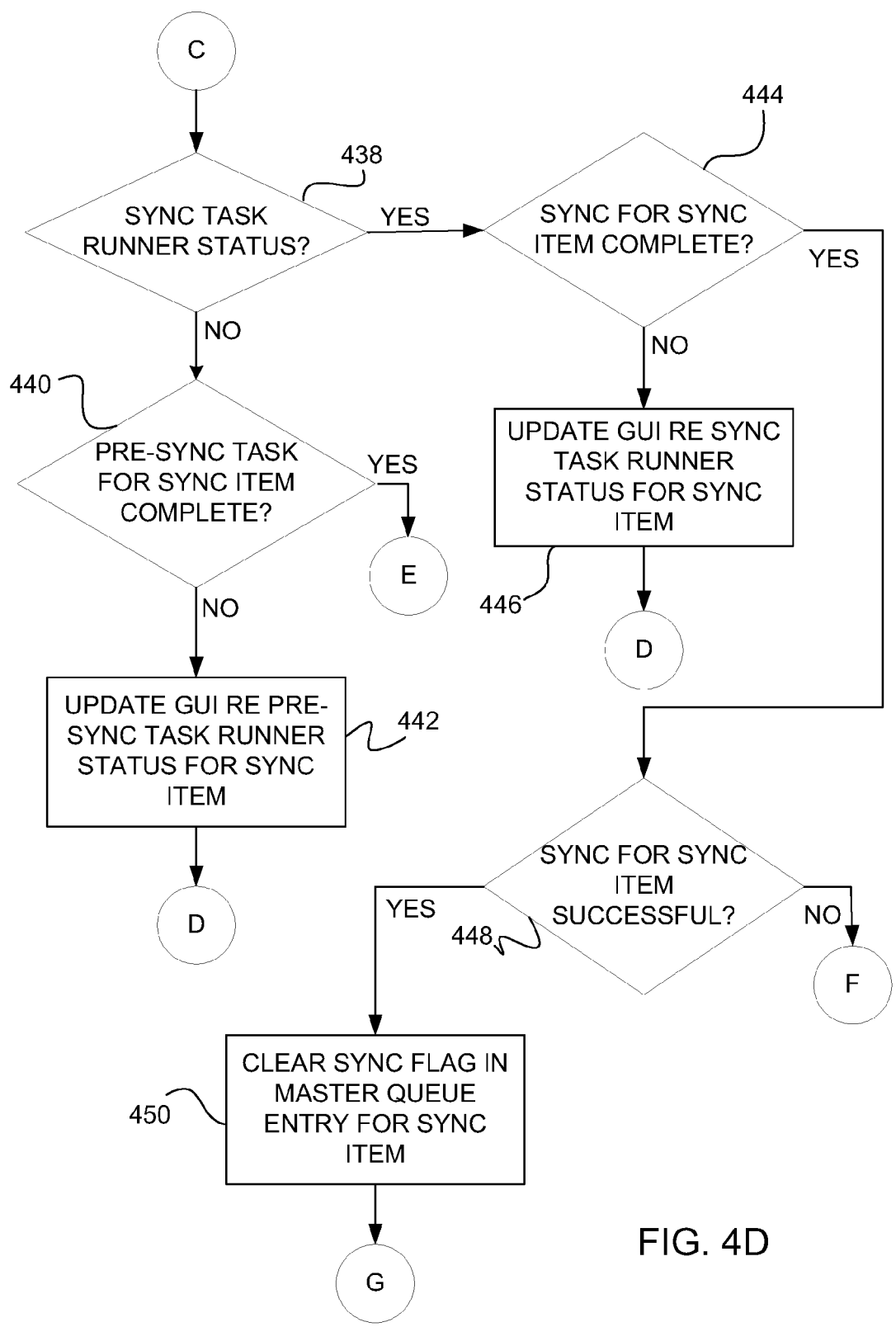

If at decision block 414 it is determined that status has been received from a task runner, then referring to FIG. 4D, in an embodiment at decision block 438 a determination is made as to whether or not status has been received from the sync task runner. If no, then status must have been received from a pre-sync task runner and in an embodiment at decision block 440 a determination is made as to whether the received status indicates that the pre-sync task is finished processing the indicated sync item. If no, then in an embodiment the received status is periodic status on a pre-sync task for a sync item and the sync GUI is updated to indicate the current status 442. In an embodiment control returns to decision block 414 of FIG. 4A, where again a determination is made as to whether status has been received from a task runner.

Figure 4E:
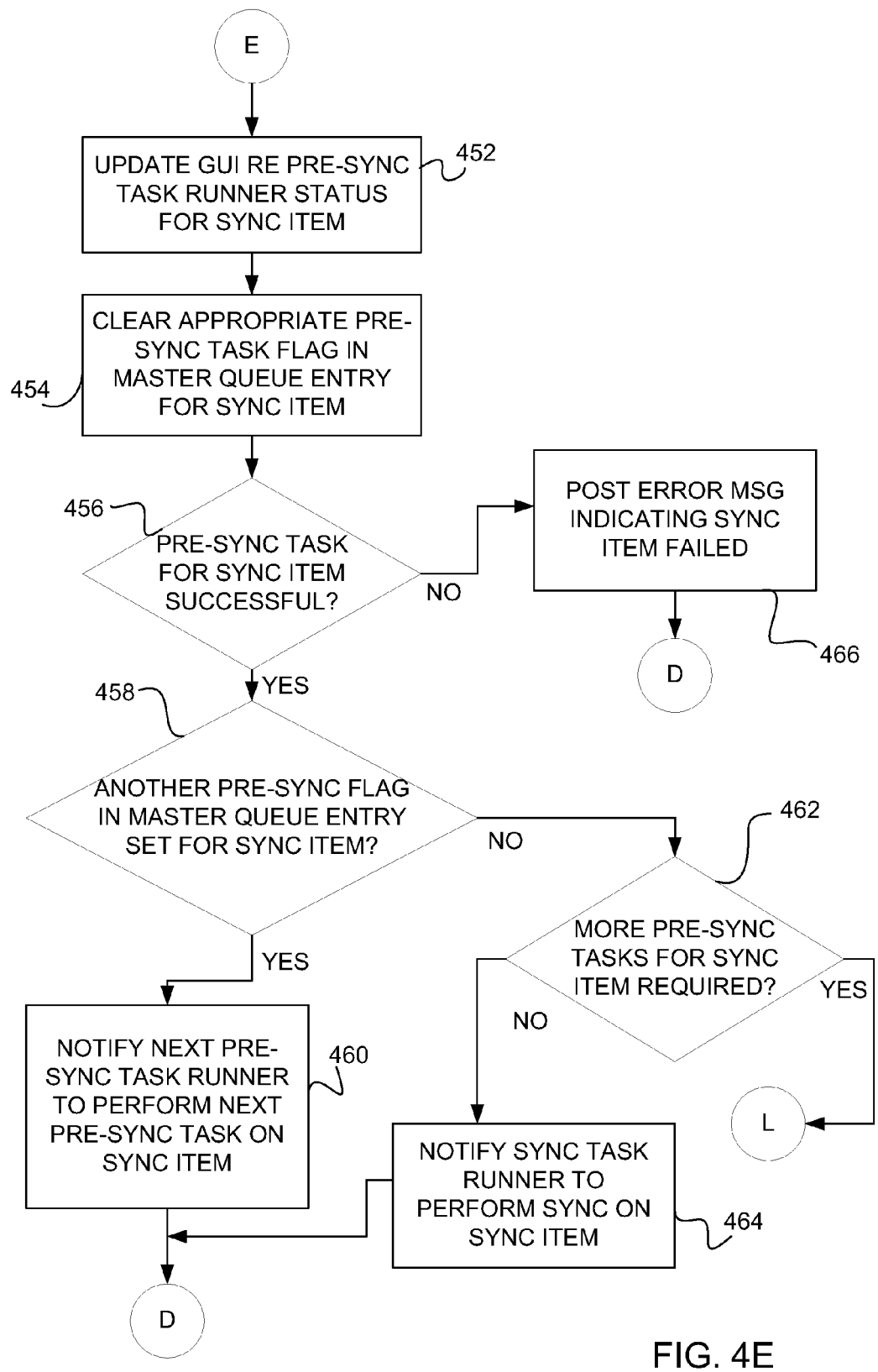

If at decision block 440 it is determined that the received status indicates a pre-sync task is complete for a sync item then referring to FIG. 4E, in an embodiment the sync GUI is updated to indicate the current status 452. In an embodiment the appropriate pre-sync task flag in the master queue entry for the sync item is cleared 454. Thus, for example, and referring to FIG. 2, if the transcode task runner 250 sends status to the engine manager 105 indicating that the transcode task completed for F2 204 then the T flag 236 in the master queue entry 224 for F2 204 is cleared.

Referring again to FIG. 4E, in an embodiment at decision block 456 a determination is made as to whether the received status indicates the pre-sync task successfully completed for the sync item. If no, in an embodiment an error message is posted for the end user indicating the respective sync item cannot be synced 466. In an embodiment control flow logic then returns to decision block 414 of FIG. 4A, where again a determination is made as to whether status has been received from a task runner.

If at decision block 456 it is determined that the received status indicates the successful completion of a pre-sync task for a sync item then in an embodiment at decision block 458 a determination is made as to whether the master queue indicates another pre-sync task is required for the sync item. In an embodiment, at decision block 458 a determination is made as to whether there are any other pre-sync task flags set for the sync item. If yes, in an embodiment the engine manager notifies the pre-sync task runner for the next pre-sync task to be performed for the sync item to process the sync item 460. In an embodiment control returns to decision block 414 of FIG. 4A, where again a determination is made as to whether status has been received from a task runner.

If at decision block 458 it is determined that the master queue does not indicate another pre-sync task is required for the sync item then in an embodiment at decision block 462 the engine manager determines whether more pre-sync tasks are required for the sync item. For example, the engine manager may not have been able to determine that a first sync item requires a license until the first sync item is successfully downloaded from an on-line store. Thus, in embodiments and some circumstances the engine manager may be unable to identify all pre-sync tasks required for one or more sync items in a sync set at the time a sync request is first received and processed. In these embodiments and circumstances the engine manager reviews a sync item in a sync set after a pre-sync task is successfully completed for the sync item to discern whether there is now information that indicates additional pre-sync task(s) are required for the sync item.

If at decision block 462 a determination is made that no additional pre-sync tasks are required for the sync item that just completed a pre-sync task then in an embodiment the engine manager notifies the sync task runner to sync the sync item 464. In an embodiment control returns to decision block 414 of FIG. 4A, where again a determination is made as to whether status has been received from a task runner.

Figure 4F:
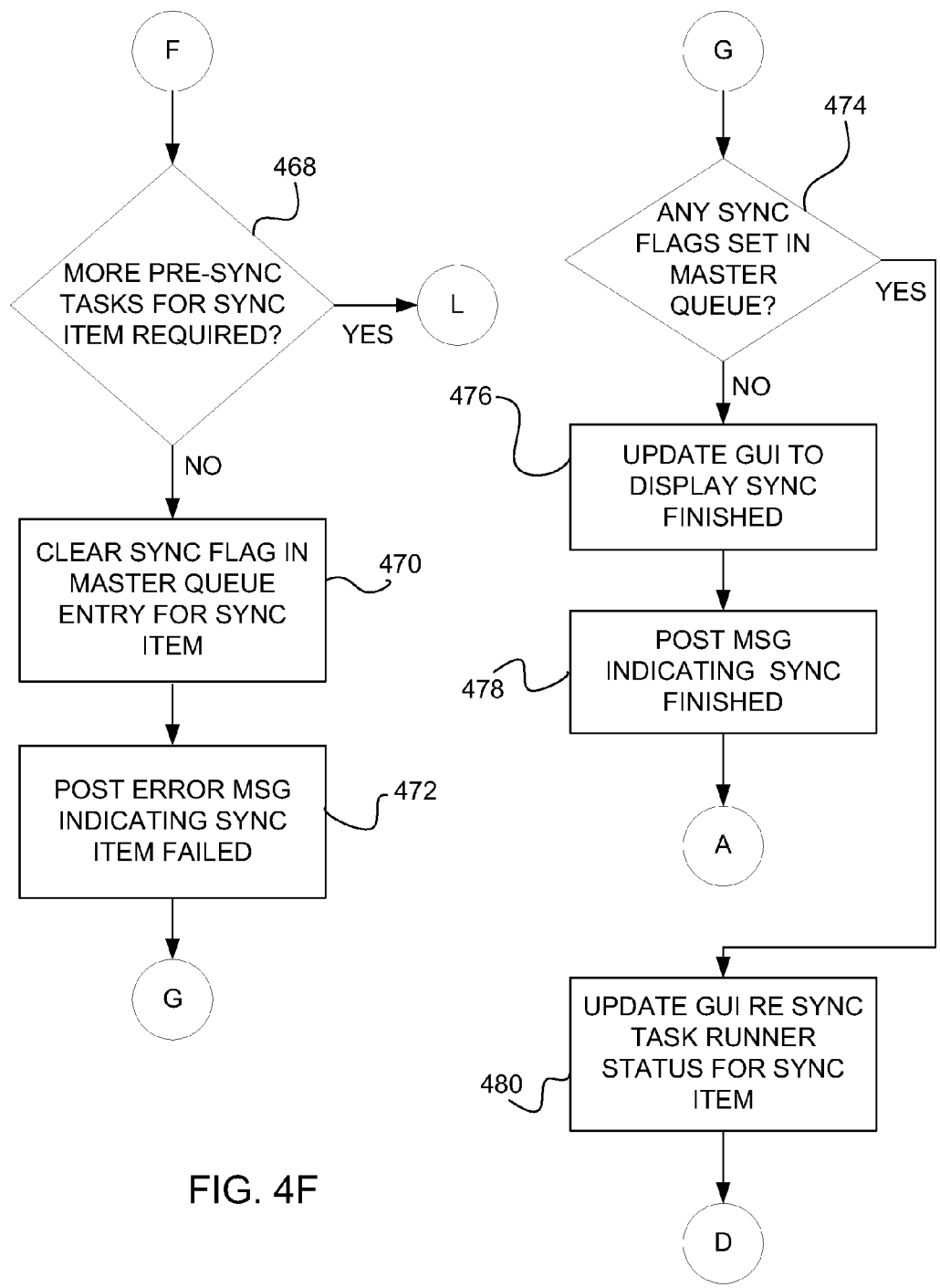
Figure 4G:
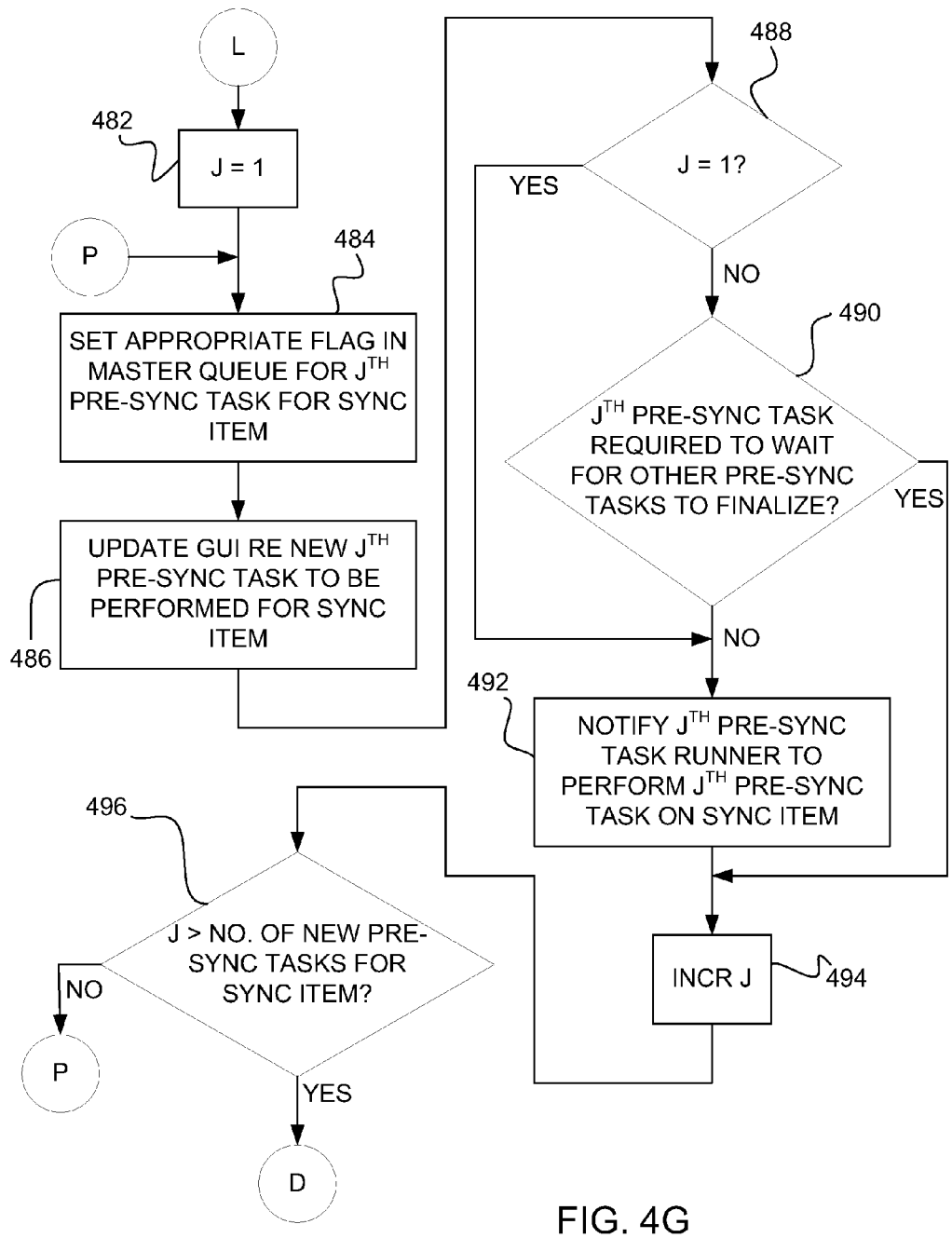

If at decision block 462 it is determined that at least one more pre-sync task is required for the sync item that just successfully completed a pre-sync task then referring to FIG. 4G, in an embodiment a variable, j, for keeping track of the number of new pre-sync tasks to be performed for the sync item is initialized to one (1) 482. In an embodiment the engine manager sets an appropriate pre-sync flag in the sync entry in the master queue for the $j^{th}$ pre-sync task to be performed for the sync item 484.

In an embodiment the engine manager updates the sync GUI to reflect new formulas for sync status that include consideration of the new $j^{th}$ pre-sync task to be performed for the sync item 486.

In an embodiment at decision block 488 a determination is made as to whether variable j is equal to one (1), i.e., whether the engine manager is processing the first new pre-sync task for the sync item. If no then in an embodiment at decision block 490 a determination is made as to whether the $j^{th}$ pre-sync task for the sync item is required to wait for other pre-sync tasks for the sync item to complete.

If at decision block 488 it is determined that j is equal to one, i.e., the engine manager is processing a first new pre-sync task for the sync item, or at decision block 490 it is determined that the $j^{th}$ pre-sync task need not wait for any other pre-sync task for the sync item to complete, then in an embodiment the engine manager notifies the task runner associated with the $j^{th}$ pre-sync task to perform the $j^{th}$ pre-sync task on the sync item 492. For example, and referring to FIG. 2, once F1 202 is successfully downloaded, if the engine manager thereafter determines F1 202 requires transcoding the engine manager 105 can then notify the transcode task runner 250 to translate F1 202.

In an embodiment variable j is incremented 494. At decision block 496 a determination is made as to whether variable j is greater than the number of newly identified pre-sync tasks required for the sync item. If no, in an embodiment the engine manager sets an appropriate pre-sync flag in the sync entry in the master queue for this next $j^{th}$ pre-sync task to be performed for the sync item 484.

If at decision block 496 it is determined that j is greater than the number of newly identified pre-sync tasks for the sync item then in an embodiment control returns to decision block 414 of FIG. 4A, where again a determination is made as to whether status has been received from a task runner Referring again to FIG. 4D, if at decision block 438 it is determined that the status received is from the sync task runner then in an embodiment at decision block 444 a determination is made as to whether the received status indicates the sync task runner is finished processing the indicated sync item. If no, then in an embodiment the received status is periodic status on the sync processing of the sync item and the sync GUI is updated to indicate the current status 446. In an embodiment control returns to decision block 414 of FIG. 4A, where again a determination is made as to whether status has been received from a task runner.

If at decision block 444 it is determined that the received status indicates the sync task is complete for a sync item then in an embodiment at decision block 448 a determination is made as to whether the sync status indicates the synchronization of the indicated sync item successfully completed. In some circumstances the sync task may fail for a sync item because the engine manager was unable to discern one or more pre-sync tasks were required for the sync item prior to attempting to perform the actual sync of the item to a second computing device. Thus, in an embodiment if at decision block 448 it is determined that the current sync item failed syncing to a second computing device then at decision block 468 of FIG. 4F a determination is made as to whether or not one or more pre-sync tasks are now identified as required for the sync item. If yes, then referring to FIG. 4G once again, in an embodiment a variable, j, for keeping track of the number of pre-sync tasks now identified as required for the sync item is initialized to one (1) 482.

If at decision block 468 of FIG. 4F it is determined that there are no new pre-sync tasks identified for the sync item, and thus the sync item failed to be synced, then in an embodiment the sync flag in the master queue for the sync item is cleared 470. In an embodiment an error message is posted for the end user indicating the respective sync item failed to be synced to the second computing device 472. At decision block 474 a determination is made as to whether all the sync items in the current sync set have finished processing, successfully or otherwise, i.e., is the sync request processing completed. Thus in an embodiment at decision block 474 a determination is made as to whether any sync flags in the master queue for the sync set are still set.

If at decision block 474 there are still sync flags in the master queue that are set, indicating there are still sync items in the sync set that have not finalized processing, then in an embodiment the sync GUI is updated to reflect the sync completion, successful or otherwise, of the indicated sync item 480. In an embodiment control returns to decision block 414 of FIG. 4A, where again a determination is made as to whether status has been received from a task runner.

If at decision block 474 if is determined that there are no sync flags set in the master queue then in an embodiment the sync GUI is updated to display the final sync request status 476. In an embodiment a message is posted for the end user noting that synchronization is finalized and indicating the sync request status 478. In an embodiment control returns to decision block 400 of FIG. 4A where a determination is made as to whether there is a sync request to be processed.

Referring to FIG. 4D, if at decision block 448 it is determined that the sync task runner status for the indicated sync item indicates that the sync item was successfully synced to a second computing device then in an embodiment the sync flag in the master queue entry for the sync item is cleared 450. Referring to FIG. 4F, in an embodiment at decision block 474 a determination is made as to whether there are any sync flags set in the master queue, indicating that there are still sync items in the sync set to be synced.

Figure 5A:
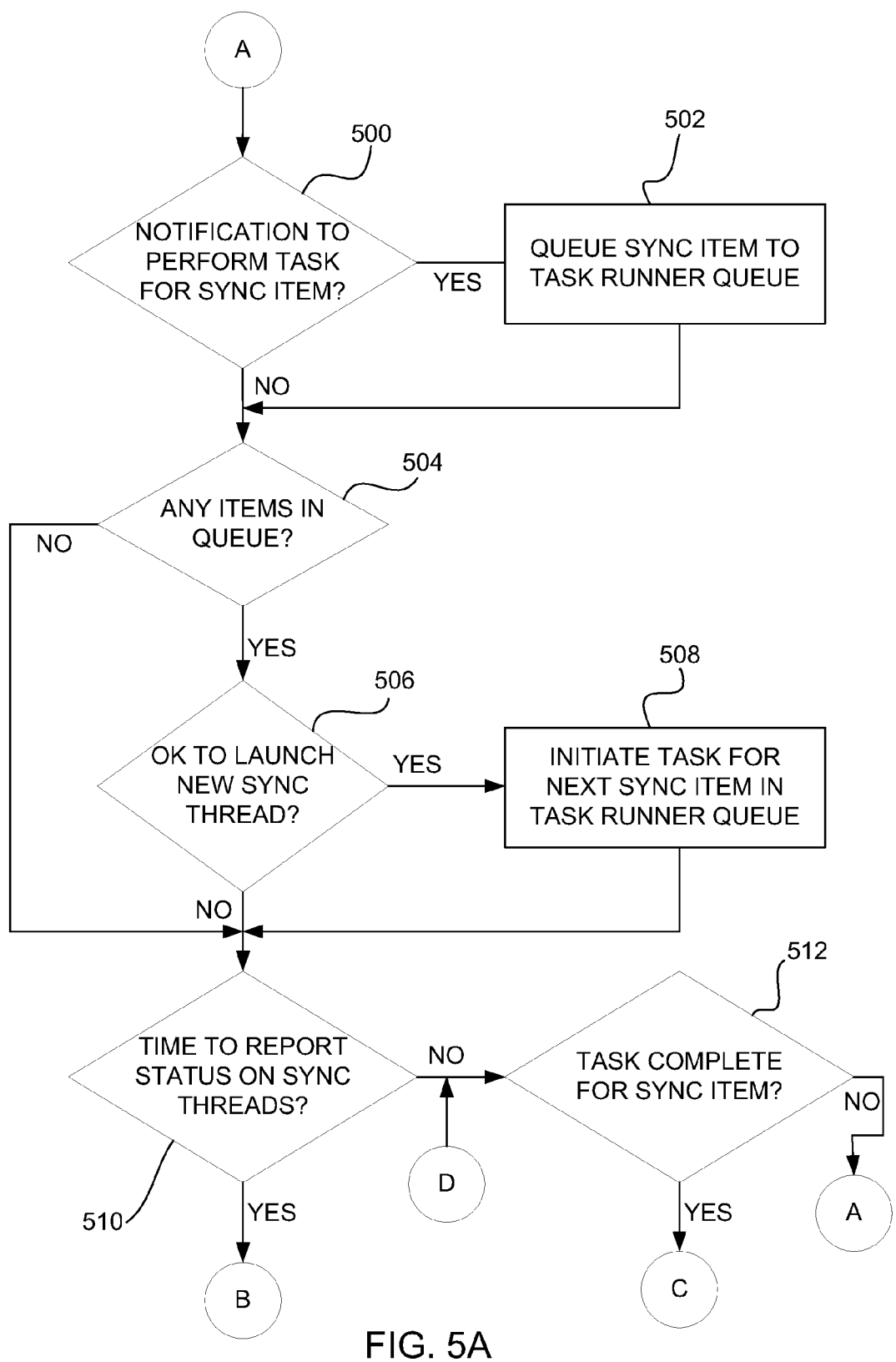
FIGS. 5A-5B illustrate an embodiment logic flow for a task runner of an adaptable sync engine.
Figure 5B:
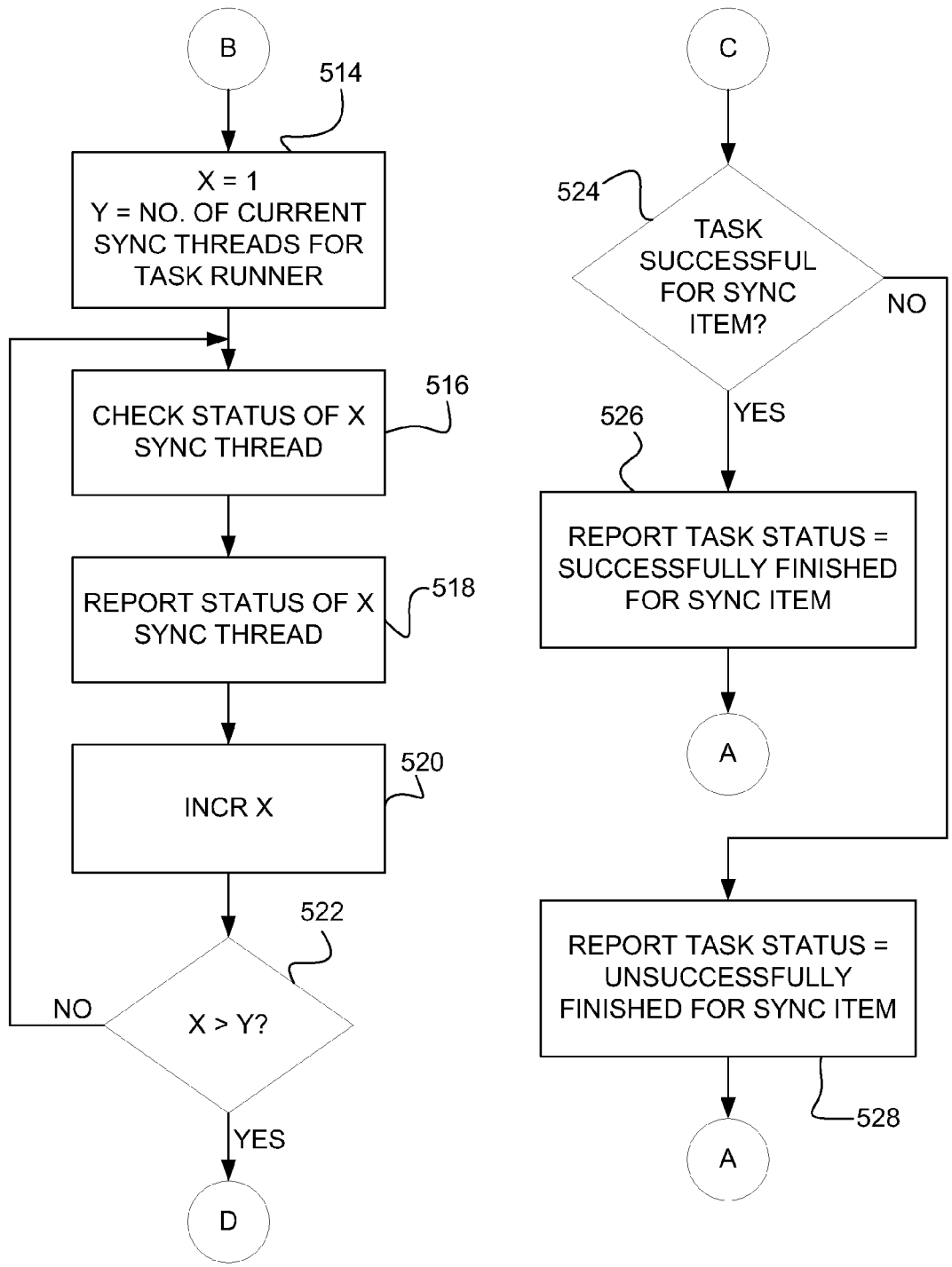

FIGS. 5A-5B illustrate an embodiment logic flow for implementing an embodiment task runner 110 of an embodiment ASE 100. While the following discussion is made with respect to systems portrayed herein the operations described may be implemented in other systems. Further, the operations described herein are not limited to the order shown. Additionally, in other alternative embodiments more or fewer operations may be performed.

In an embodiment at decision block 500 a determination is made as to whether the task runner has received a notification from the engine manager to perform its task on an indicated sync item. If yes, in an embodiment the task runner queues the sync item to its task runner queue 502.

In an embodiment at decision block 504 a determination is made as to whether there are any active entries in the task runner's queue. If yes, in an embodiment at decision block 506 a determination is made as to whether conditions are appropriate to launch a task thread for the next indicated sync item in the task runner queue. In this embodiment the task runner determines if the established rules and current conditions allow for launching a new task thread at this time. For example, if the task runner is limited to three task threads at any one time and it already has three task threads processing then at decision block 506 the task runner will determine that the conditions do not allow for it to launch a new task thread at the time. As another example, if the task runner is appropriated three task threads to run concurrently and it only has two task threads currently processing but system resource usage is unacceptably high, e.g., the current CPU usage is above a pre-defined threshold value, then at decision block 506 the task runner will determine that the conditions do not allow for it to launch a new task thread at the time.

If at decision block 506 it is determined that conditions allow for the launch of a new task thread then in an embodiment the task runner initiates task processing for the next sync item indicated it its task runner queue 508.

Whether or not conditions allow for the launch of a new task thread at decision block 506 and whether or not there were any sync items indicated in the task runner's queue at decision block 504 in an embodiment at decision block 510 a determination is made as to whether it is time to report status on the task runner's current task threads. If yes, then referring to FIG. 5B, in an embodiment a variable, x, for keeping track of the number of currently processing task threads is initialized to one (1) 514. In an embodiment a second variable, y, is initialized to the number of task threads currently being processed by the task runner 514.

In an embodiment the task runner determines the status of the $x^{th}$ task thread 516 and reports the task thread status to the engine manager 518. In an embodiment x is incremented 520. At decision block 522 a determination is made as to whether x is greater than y, i.e., has status been reported for all the currently processing task threads. If no, the task runner checks the status of the next $x^{th}$ task thread 516.

If at decision block 522 it is determined that status has been reported for all the currently processing task threads then referring back to FIG. 5A in an embodiment at decision block 512 a determination is made as to whether the task runner has completed processing a sync item. If no, control returns to decision block 500 where a determination is made as to whether a notification to perform the task for a sync item has been received from the engine manager.

If at decision block 512 it is determined that the task runner has completed processing a sync item then referring to FIG. 5B, in an embodiment at decision block 524 a determination is made as to whether the task completed successfully for the sync item. If yes, in an embodiment the task runner reports a successful task completion status for the sync item to the engine manager 526. In an embodiment control returns to decision block 500 where a determination is made as to whether a notification to perform the task for a sync item has been received from the engine manager.

If at decision block 524 it is determined that the task failed for the sync item then in an embodiment the task runner reports an unsuccessful task completion status for the sync item to the engine manager 528. In an embodiment control returns to decision block 500 where a determination is made as to whether a notification to perform the task for a sync item has been received from the engine manager.

Computing Device System Configuration

Figure 6:
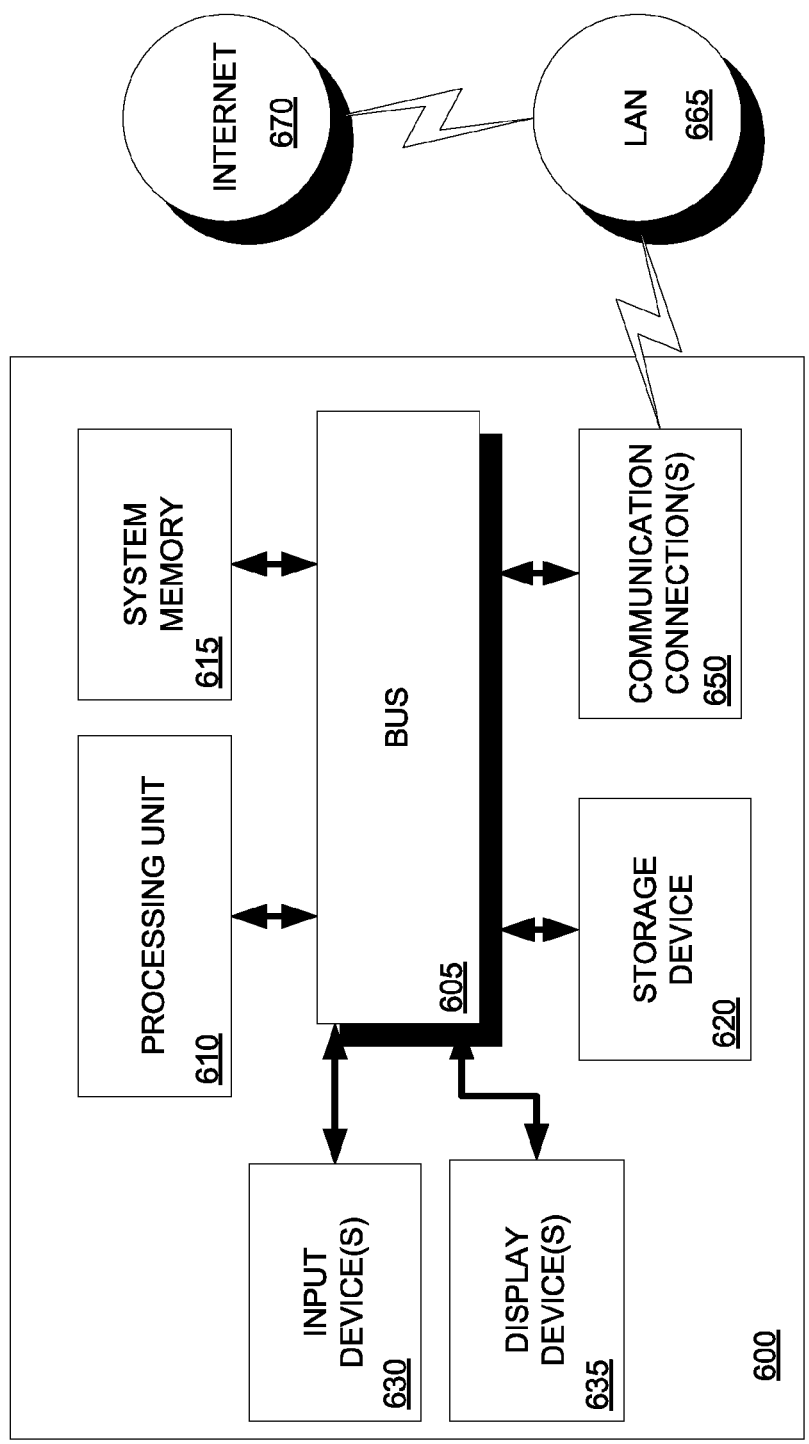
FIG. 6 is a block diagram of an exemplary basic computing device system that can process software, i.e., program code, or instructions.

FIG. 6 is a block diagram that illustrates an exemplary computing device system 600 upon which an embodiment can be implemented. The computing device system 600 includes a bus 605 or other mechanism for communicating information, and a processing unit 610 coupled with the bus 605 for processing information. The computing device system 600 also includes system memory 615, which may be volatile or dynamic, such as random access memory (RAM), non-volatile or static, such as read-only memory (ROM) or flash memory, or some combination of the two. The system memory 615 is coupled to the bus 605 for storing information and instructions to be executed by the processing unit 610, and may also be used for storing temporary variables or other intermediate information during the execution of instructions by the processing unit 610. The system memory 615 often contains an operating system and one or more programs, and may also include program data.

In an embodiment, a storage device 620, such as a magnetic or optical disk, is also coupled to the bus 605 for storing information, including program code comprising instructions and/or data.

The computing device system 600 generally includes one or more display devices 635, such as, but not limited to, a display screen, e.g., a cathode ray tube (CRT) or liquid crystal display (LCD), a printer, and one or more speakers, for providing information to a computing device user. The computing device system 600 also generally includes one or more input devices 630, such as, but not limited to, a keyboard, mouse, trackball, pen, voice input device(s), and touch input devices, which a computing device user can use to communicate information and command selections to the processing unit 610. All of these devices are known in the art and need not be discussed at length here.

The processing unit 610 executes one or more sequences of one or more program instructions contained in the system memory 615. These instructions may be read into the system memory 615 from another computing device-readable medium, including, but not limited to, the storage device 620. In alternative embodiments, hard-wired circuitry may be used in place of or in combination with software program instructions. The computing device system environment is not limited to any specific combination of hardware circuitry and/or software.

The term "computing device-readable medium" as used herein refers to any medium that can participate in providing program instructions to the processing unit 610 for execution. Such a medium may take many forms, including but not limited to, storage media and transmission media. Examples of storage media include, but are not limited to, RAM, ROM, EEPROM, flash memory, CD-ROM, digital versatile disks (DVD), magnetic cassettes, magnetic tape, magnetic disk storage, or any other magnetic medium, floppy disks, flexible disks, punch cards, paper tape, or any other physical medium with patterns of holes, memory chip, or cartridge. The system memory 615 and storage device 620 of the computing device system 600 are further examples of storage media. Examples of transmission media include, but are not limited to, wired media such as coaxial cable(s), copper wire and optical fiber, and wireless media such as optic signals, acoustic signals, RF signals and infrared signals.

The computing device system 600 also includes one or more communication connections 650 coupled to the bus 605. The communication connection(s) 650 provide a two-way data communication coupling from the computing device system 600 to other computing devices on a local area network (LAN) 665 and/or wide area network (WAN), including the World Wide Web, or Internet 670. Examples of the communication connection(s) 650 include, but are not limited to, an integrated services digital network (ISDN) card, modem, LAN card, and any device capable of sending and receiving electrical, electromagnetic, optical, acoustic, RF or infrared signals.

Communications received by the computing device system 600 can include program instructions and program data. The program instructions received by the computing device system 600 may be executed by the processing unit 610 as they are received, and/or stored in the storage device 620 or other non-volatile storage for later execution.

CONCLUSION

While various embodiments are described herein, these embodiments have been presented by way of example only and are not intended to limit the scope of the claimed subject matter. Many variations are possible which remain within the scope of the following claims. Such variations are clear after inspection of the specification, drawings and claims herein. Accordingly, the breadth and scope of the claimed subject matter is not to be restricted except as defined with the following claims and their equivalents.

What is claimed is:

1. A method for adaptable synchronization of two or more sync items from the first computing device to the second computing device, the method comprising:

identifying that a first pre-sync task is required for a first sync item of the two or more sync items;

storing a designation of the first pre-sync task for the first sync item;

identifying that the first pre-sync task is required for a second sync item of the two or more sync items;

storing a designation of the first pre-sync task for the second sync item;

storing a designation of a sync task for the first sync item;

storing a designation of the sync task for the second sync item;

launching a first task thread for performing the first pre-sync task for the first sync item;

launching a second task thread to perform the first pre-sync task for the second sync item concurrently with the first task thread;

establishing a first sync status equation for the first sync item wherein the first sync status equation is used to calculate the sync status of the first sync item at any time t and wherein the first sync status equation comprises a first percent wherein the first percent is an estimated percentage of processing time for finalizing synchronization of the first sync item for processing the first pre-sync task for the first sync item;

establishing a second sync status equation for the second sync item wherein the second sync status equation is used to calculate the sync status of the second sync item at any time t and wherein the second sync status equation comprises a second percent wherein the second percent is an estimated percentage of processing time for finalizing synchronization of the second sync item for processing the first pre-sync task for the second sync item;

and establishing a sync set status equation for the two or more sync items wherein the sync set status equation comprises a sum of the first sync status and the second sync status.

2. The method for adaptable synchronization of two or more sync items of claim 1 wherein the designation of the first pre-sync task for the first sync item is a flag for the first pre-sync task in an entry in a master queue for the first sync item and the designation of the first pre-sync task for the second sync item is a flag for the first pre-sync task in an entry in the master queue for the second sync item.

3. The method for adaptable synchronization of two or more sync items of claim 1, further comprising:

establishing a rule for governing the number of task threads that the first pre-sync task can execute concurrently; and launching the second task thread to perform the first pre-sync task for the second sync item concurrently with the first task thread when the number of task threads executing concurrently for the first pre-sync task will satisfy the rule governing the number of task threads that the first pre-sync task can execute concurrently.

4. The method for adaptable synchronization of two or more sync items of claim 3 wherein the rule established for governing the number of task threads that the first pre-sync task can execute concurrently is a maximum number of allowable concurrent task threads.

5. The method for adaptable synchronization of two or more sync items of claim 3 wherein the rule established for governing the number of task threads that the first pre-sync task can execute concurrently comprises a maximum allowable system resource usage at a time t.

6. The method for adaptable synchronization of two or more sync items of claim 1, further comprising:

using the first sync status equation for the first sync item to display sync status for the first sync item in a graphical user interface at a time t;

using the second sync status equation for the second sync item to display sync status for the second sync item in a graphical user interface at a time t; and using the sync set status equation to display sync status for the two or more sync items at a time t.

7. The method for adaptable synchronization of two or more sync items of claim 1, further comprising:

identifying that a second pre-sync task is required for the second sync item of the two or more sync items wherein the second pre-sync task cannot be executed for the second sync item until the first pre-sync task is successfully executed for the second sync item;

storing a designation of the second pre-sync task for the second sync item; and launching a third task thread for performing the second pre-sync task for the second sync item after the second task thread is successfully ended and the first task thread is processing.

8. The method for adaptable synchronization of two or more sync items of claim 1, further comprising:

launching a third task thread for executing the sync task for the first sync item after the first task thread is successfully ended;

launching a fourth task thread for executing the sync task for the second sync item after the second task thread is successfully ended;

identifying that the fourth task thread completed unsuccessfully and that a second pre-sync task is required for the second sync item;

storing a designation of the second pre-sync task for the second sync item;

launching a fifth task thread for executing the second pre-sync task for the second sync item; and launching a sixth task thread for executing the sync task for the second sync item after the fifth task thread is successfully ended.

9. The method for adaptable synchronization of two or more sync items of claim 8 wherein the second sync status equation for the second sync item is redefined to comprise a third percent wherein the third percent is an estimated percentage of processing time for finalizing synchronization of the second sync item for processing the second pre-sync task for the second sync item.

10. The method for adaptable synchronization of two or more sync items of claim 1 wherein the first pre-sync task comprises transcoding a sync file and the sync task comprises syncing a sync file from a end user's computing device to a second computing device.

11. A method for synchronizing two or more items from the first computing device to the second computing device, the method comprising:

establishing a first rule for governing the number of items that can have a first pre-sync task performed on them concurrently;

identifying that the first pre-sync task is required for a first item of the two or more items;

launching a first task thread for performing the first pre-sync task for the first item;

identifying that the first pre-sync task is required for a second item of the two or more items;

launching a second task thread to perform the first pre-sync task for the second sync item concurrently with the first task thread when the first rule will not be violated by launching the second task thread concurrently with the first task thread;

establishing a second rule for governing the number of items that can have a second pre-sync task performed on them concurrently;

identifying that the second pre-sync task is required for the first item of the two or more items;

launching a task thread for performing the second pre-sync task for the first item if the second rule will not be violated by launching the task thread for performing the second pre-sync task for the first item and either the first task thread is completed or the first pre-sync task and the second pre-sync task can be performed concurrently for the first item;

establishing a first sync status equation for the first item wherein the first sync status equation is used to calculate the sync status of the first item at any time t and wherein the first sync status equation comprises a first percent that is an estimated percentage of processing time for synchronization of the first item for processing the first pre-sync task for the first item, wherein the first sync status equation comprises a second percent that is an estimated percentage of the processing time for synchronization of the first item for processing the second pre-sync task for the first item, and wherein the first sync status equation comprises a third percent that is an estimated percentage of the processing time for synchronization of the first item for syncing the first item from a first computing device to a second computing device;

establishing a second sync status equation for the second item wherein the second sync status equation is used to calculate the sync status of the second item at any time t and wherein the second sync status equation comprises a fourth percent wherein the fourth percent is an estimated percentage of processing time for synchronization of the second item for processing the first pre-sync task for the second item and wherein the second sync status equation comprises a fifth percent wherein the fifth percent is an estimated percentage of processing time for synchronization of the second item for syncing the second item from the first computing device to the second computing device;

establishing a sync set status equation for the two or more items wherein the sync set status equation comprises a sum of the first sync status and the second sync status; and syncing the first item when all pre-sync tasks required for the first item are successfully completed.

12. The method for synchronizing two or more items of claim 11 wherein the first rule comprises a maximum number of allowable concurrently executing task threads for the first pre-sync task and the second rule comprises a maximum number of allowable concurrently executing task threads for the second pre-sync task.

13. The method for synchronizing two or more items of claim 11 wherein identifying that the first pre-sync task is required for the first item comprises setting a flag for the first pre-sync task in an entry in a master queue for the first item and wherein identifying that the first pre-sync task is required for the second item comprises setting a flag for the first pre-sync task in an entry in the master queue for the second item.

14. The method for synchronizing two or more items of claim 11 wherein the first pre-sync task comprises transcoding files to be synchronized, the second pre-sync task comprises obtaining a license for files to be synchronized, and synchronizing the first item comprises syncing the first item between a first computing device and a second computing device.

15. The method for synchronizing two or more items of claim 14, further comprising:
generating a first entry in a master queue for the first sync item of the two or more items;
setting a flag for the first pre-sync task in the first entry in the master queue;
setting a flag for the second pre-sync task in the first entry in the master queue;
setting a flag for a sync task in the first entry in the master queue;
generating a second entry in the master queue for the second sync item of the two or more items;
setting a flag for the first pre-sync task in the second entry in the master queue;
setting a flag for the sync task in the second entry in the master queue;
generating a first entry in a first pre-sync task queue that indicates the first pre-sync task is to be executed for the first item of the two or more items;
generating a second entry in the first pre-sync task queue that indicates the first pre-sync task is to be executed for the second item of the two or more items;
and generating a first entry in a second pre-sync task queue that indicates the second pre-sync task is to be executed for the first item of the two or more items.

16. The method for synchronizing two or more items of claim 15 wherein the first pre-sync task must be successfully executed on an item before the second pre-sync task can be executed on the item and wherein generating the first entry in the second pre-sync task queue is performed after the first pre-sync task successfully completes processing the first item of the two or more items.

* * * * *